US007768881B2

(12) United States Patent
Yamamoto et al.

(10) Patent No.: US 7,768,881 B2
(45) Date of Patent: Aug. 3, 2010

(54) MEDIUM, APPARATUS, AND METHOD OF RECORDING OPTICAL-INFORMATION

(75) Inventors: Yuichiro Yamamoto, Tokyo (JP); Shinichi Tatsuta, Tokyo (JP); Yuji Kubota, Kanagawa (JP); Akiko Hirao, Chiba (JP); Kazuki Matsumoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 634 days.

(21) Appl. No.: 11/677,729

(22) Filed: Feb. 22, 2007

(65) Prior Publication Data

US 2007/0230292 A1 Oct. 4, 2007

(30) Foreign Application Priority Data

Mar. 28, 2006 (JP) ............................. 2006-089280

(51) Int. Cl.
*G11B 7/00* (2006.01)
(52) U.S. Cl. .............. 369/44.26; 369/44.25; 369/44.28; 369/44.34; 369/44.37; 369/103; 369/112.1; 369/112.15; 369/112.05; 369/275.1; 369/275.2; 369/275.3; 369/275.4
(58) Field of Classification Search ....................... None
See application file for complete search history.

(56) References Cited

U.S. PATENT DOCUMENTS

| 7,545,729 | B2 * | 6/2009 | Yamamoto et al. | ........ 369/275.3 |
| 2003/0090969 | A1 * | 5/2003 | Matsumoto et al. | ...... 369/44.34 |
| 2003/0147328 | A1 * | 8/2003 | Horimai et al. | ............. 369/103 |
| 2004/0062178 | A1 * | 4/2004 | Horimai | ..................... 369/103 |
| 2007/0223326 | A1 |  9/2007 | Yamamoto et al. | |

FOREIGN PATENT DOCUMENTS

| JP | 11-273112 | 10/1999 |
| JP | 2003-085768 | 3/2003 |
| JP | 2003-178456 | 6/2003 |
| JP | 2004-158113 | 6/2004 |
| JP | 2004-265472 | 9/2004 |
| JP | 2005-032354 | 2/2005 |

OTHER PUBLICATIONS

Japanese Decision of Patent Grant mailed on Jan. 13, 2009 corresponding to U.S. Appl. No. 11/677,729, filed on Feb. 22, 2007.
Horimai et al, A Novel Collinear Optical Setup for Holographic Data Storage, Optical Storage Data, 2004, pp. 297-303, 2004.
Horimae et al, Advanced Collinear Holography, Optical Review, 2005, pp. 90-92, vol. 12, No. 2.

* cited by examiner

*Primary Examiner*—Daniell L Negrón
*Assistant Examiner*—Ifedayo Iluyomade
(74) *Attorney, Agent, or Firm*—Turocy & Watson, LLP

(57) ABSTRACT

An optical-information recording medium includes a substrate that includes a servo surface having a servo pattern thereon; an information recording layer laminated on the servo surface of the substrate capable of recording information as a hologram produced by interference between an information beam containing the information and a reference beam; an address servo area that is formed as a part of the servo pattern, and that records therein address information and clock information for aligning a beam, emitted from an optical-information recording apparatus for recording information in the information recording layer, to a target position in the information recording layer; and a following up servo area that is formed as a part of the servo pattern, and that is to be irradiated by the beam to make the beam follow a rotation of the optical-information recording medium.

20 Claims, 18 Drawing Sheets

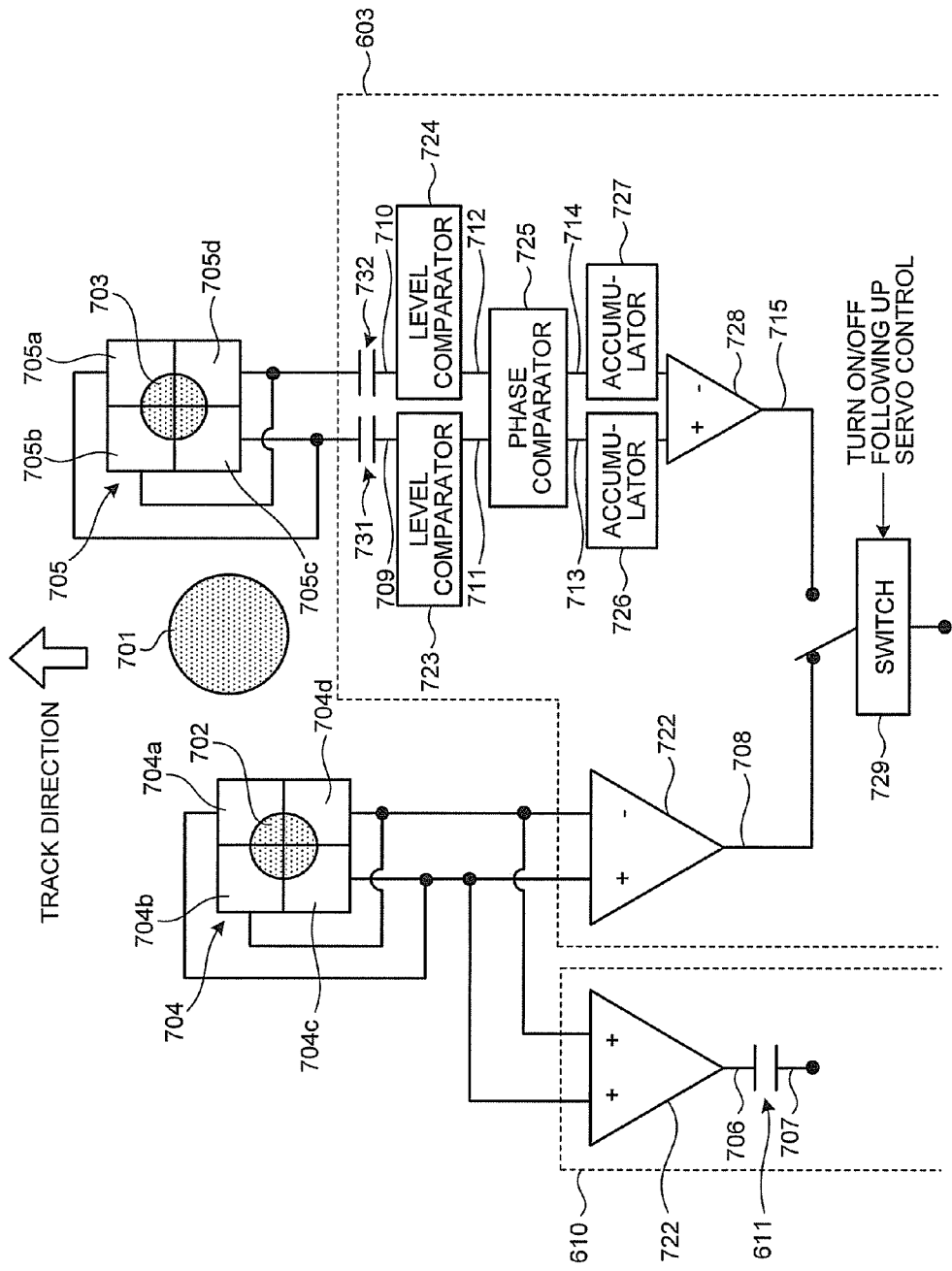

MEDIUM, APPARATUS, AND METHOD OF RECORDING OPTICAL-INFORMATION

CROSS-REFERENCE TO RELATED APPLICATIONS

This application is based upon and claims the benefit of priority from the prior Japanese Patent Application No. 2006-89280, filed on Mar. 28, 2006; the entire contents of which are incorporated herein by reference.

BACKGROUND OF THE INVENTION

1. Field of the Invention

The present invention relates to an optical information recording medium, an optical information recording apparatus and an optical information recording method for recording information as hologram.

2. Description of the Related Art

High-density stacked-volumetric optical disks using holography (hereinafter, "holographic-optical-disks") and record-playback apparatus for the holographic-optical-disks have been actively developed for practical use. The holographic-optical-disks record information by interfering an information beam that includes an image to be recorded with a reference beam for recording the image in a photosensitive material, and records a two-dimensional image resulting from digital encoding by a spatial light modulator such as a liquid crystal device and a digital micromirror device. The information is three-dimensional record that can be recorded in the longitudinal direction of an information recording layer. The information can be multiplexed at an identical location or overlapping locations of the information recording layers. This allows much more information to be recorded than conventional optical recording method of recording information in a plane such as high definition digital versatile disk (HD DVD) standard and Blu-ray standard. Moreover, because the information can be read in the unit of two-dimensional image, the holographic-optical-disk is advantageous in that the information can be transferred at a high speed.

Among various technologies developed for the record-playback apparatus for the holographic-optical-disk, collinear holographic recording method in which the information beam and the reference beam are aligned on the same axis is focused on as a replacement of the optical disk record-playback apparatus compliant with the HD DVD or the Blu-ray.

Technologies of the collinear holographic recording are disclosed in "Advanced Collinear Holography" (Optical Review, Vol. 12, No. 2, 90-92 (2005)), "A Novel Collinear Optical Setup for Holographic Data Storage System" (Proceedings of SPIE of Optical Data Storage 2004, pp. 297-303 (2004)), JP-A 2004-265472 (KOKAI), and the like. Based on the collinear holographic recording technology, the spatial light modulator produces the information beam and the reference beam as a record-playback laser by modulating the light intensity of a green or blue-violet laser beam, and an objective lens focuses the information beam and the reference beam on the information recording layer of the optical disk. The information beam and the reference beam are overlapped in the information recording layer to produce an interference fringe pattern, and the interference fringe pattern is fixed in the information recording layer, whereby the information is recorded as a hologram.

The collinear holographic recording method uses a shift multiplexing method of recording the information while the holographic-optical-disk rotates, namely while shifting locations on the holographic-optical-disk. The information on the holographic-optical-disk is played back by focusing only the reference beam for playing back on the information recording layer using the objective lens, accepting the diffracted light from the interference fringe pattern in the information recording layer by a solid-state image sensor using a complementary metal oxide semiconductor (CMOS) or charge-coupled device (CCD), and decoding the accepted two-dimensional image.

A focusing servo and a tracking servo on the holographic-optical-disk use a red laser beam whose wave length is different from that of the record-playback laser (a green or blue-violet laser beam), and the servo control is performed in the same manner as with the existing record-playback method such as the HD DVD and the Blu-ray.

More specifically, when the conventional technology is used, the record—playback apparatus for the holographic-optical-disk cannot rotate the disk at a high speed at the time of recording, thereby an overhead time is required for shifting from the recording operation to the playing back operation, and seek time cannot be shortened.

In other words, to write refractive-index modulation in the information recording layer using the information beam and the reference beam, a certain exposure time is required. When the optical disk rotates at the high speed to record the information, an exposure position moves, and therefore a sharp interference-fringe pattern cannot be formed. The displacement during the exposure is a very serious problem in the system architecture because the holographic recording includes writing fine refractive-index modulation using the photosensitive material that has a high spatial resolution.

When the optical disc rotates at a low speed to prevent the displacement during the exposure, the record-playback apparatus cannot change from the recording operation to the playing back operation at the high speed.

To solve the problem, JP-A 2003-85768 (KOKAI) discloses a technology using a following up mechanism that makes an irradiating light follow the rotation of the optical disk. The following up mechanism enables the record-playback apparatus to irradiate the information beam and the reference beam while tracking the disk rotation so that the relative velocity of the beams to the optical disk is zero during the exposure.

According to the technology, a record-playback laser beam and a servo laser beam are focused on the same plane, and the optical disk includes pits for address servo, information recording area, and lockup pits for following up intermittently on an identical track. By the servo laser beam irradiating so as to follow the lockup pit, the record-playback apparatus detects an amount of disk travel and moves the record-playback laser beam to record the hologram based on the detected amount.

However, according to the technology disclosed in JP-A 2003-85768 (KOKAI), a position of the source of the following up laser beam is displaced sequentially from an optical axis of a collimating lens according to the recording position. In other words, the light source itself is mechanically driven, and therefore the light source needs to be mounted with a high accuracy. As a result, the following up is not accurate enough to put the record-playback apparatus to practical use.

Moreover, because the relative velocity of the recording beam to the optical disk becomes zero during the following up, it is difficult to perform an accurate tracking servo control.

It is therefore difficult to perform an accurate positioning of the recording beam to the target recording position.

SUMMARY OF THE INVENTION

According to one aspect of the present invention, an optical-information recording medium includes a substrate that includes a servo surface having a servo pattern thereon; an information recording layer laminated on the servo surface of the substrate capable of recording information as a hologram produced by interference between an information beam containing the information and a reference beam; an address servo area that is formed as a part of the servo pattern in a track direction on the servo surface, and that records therein address information and clock information for aligning a beam, emitted from an optical-information recording apparatus for recording information in the information recording layer, to a target position in the information recording layer; and a following up servo area that is formed as a part of the servo pattern in the track direction on the servo surface, and that is to be irradiated by the beam to make the beam follow a rotation of the optical-information recording medium, wherein the address servo area and the following up servo area are arranged in parallel extending in circumferential direction on the optical-information recording medium.

According to another aspect of the present invention, an optical-information recording apparatus includes a motor that rotates an optical-information recording medium; a light source that emits a beam; a generating unit that generates a recording beam that includes an information beam containing information and a reference beam, a first diffracted beam that is a servo beam, and a second diffracted beam that is the servo beam, from the beam emitted from the light source; a condenser that focuses the information beam and the reference beam on an optical-information recording medium, focuses the first diffracted beam on a following up servo area, and focuses the second diffracted beam on an address servo area, the optical-information recording medium being included: a substrate that includes a servo surface having a servo pattern thereon, an information recording layer laminated on the servo surface of the substrate capable of recording information as a hologram produced by interference between an information beam containing the information and a reference beam, the address servo area that is formed as a part of the servo pattern in a track direction on the servo surface, and that records therein address information and clock information for aligning the beam to a target position in the information recording layer, and the following up servo area that is formed as a part of the servo pattern in the track direction on the servo surface, and that is to be irradiated by the beam so as to make the beam follow a rotation of the optical-information recording medium, wherein the address servo area and the following up servo area are arranged in parallel extending in circumferential direction on the optical-information recording medium; a servo photodetector that detects a first reflection of the first diffracted beam reflected from the following up servo area and a second reflection of the second diffracted beam reflected from the address servo area; an irradiation-position shifting unit that shifts irradiation positions of the first diffracted beam and the second diffracted beam on the optical-information recording medium by moving the condenser; and a following up control unit that performs following-up servo control to control the irradiation-position shifting unit based on the first reflection by shifting the irradiation positions of the first diffracted beam, the second diffracted beam, and the recording beam to follow rotation of the optical-information recording medium so that relative velocity between the optical-information recording medium and the irradiation positions is substantially zero, and that records the information during the following-up servo control.

According to still another aspect of the present invention, an optical-information recording method includes rotating an optical-information recording medium; emitting a beam from a light source; generating a recording beam that includes an information beam containing information and a reference beam, a first diffracted beam that is a servo beam, and a second diffracted beam that is the servo beam, from the beam emitted from the light source; focusing the information beam and the reference beam on an optical-information recording medium; focusing the first diffracted beam on a following up servo area; focusing the second diffracted beam on an address servo area, the optical-information recording medium being included: a substrate that includes a servo surface having a servo pattern thereon, an information recording layer laminated on the servo surface of the substrate capable of recording information as a hologram produced by interference between an information beam containing the information and a reference beam, the address servo area that is formed as a part of the servo pattern in a track direction on the servo surface, and that records therein address information and clock information for aligning the beam to a target position in the information recording layer, and the following up servo area that is formed as a part of the servo pattern in the track direction on the servo surface, and that is to be irradiated by the beam so as to make the beam follow a rotation of the optical-information recording medium, wherein the address servo area and the following up servo area are arranged in parallel extending in circumferential direction on the optical-information recording medium; detecting a first reflection of the first diffracted beam reflected from the following up servo area and a second reflection of the second diffracted beam reflected from the address servo area; shifting irradiation positions of the first diffracted beam and the second diffracted beam on the optical-information recording medium by moving the condenser; performing following-up servo control based on the first reflection by shifting the irradiation positions of the first diffracted beam, the second diffracted beam, and the recording beam to follow rotation of the optical-information recording medium so that relative velocity between the optical-information recording medium and the irradiation positions is substantially zero; and recording the information during the following-up servo control.

BRIEF DESCRIPTION OF THE DRAWINGS

FIG. 7 is a schematic view for explaining a configuration of a photo detector;

DETAILED DESCRIPTION OF THE INVENTION

Figure 1:
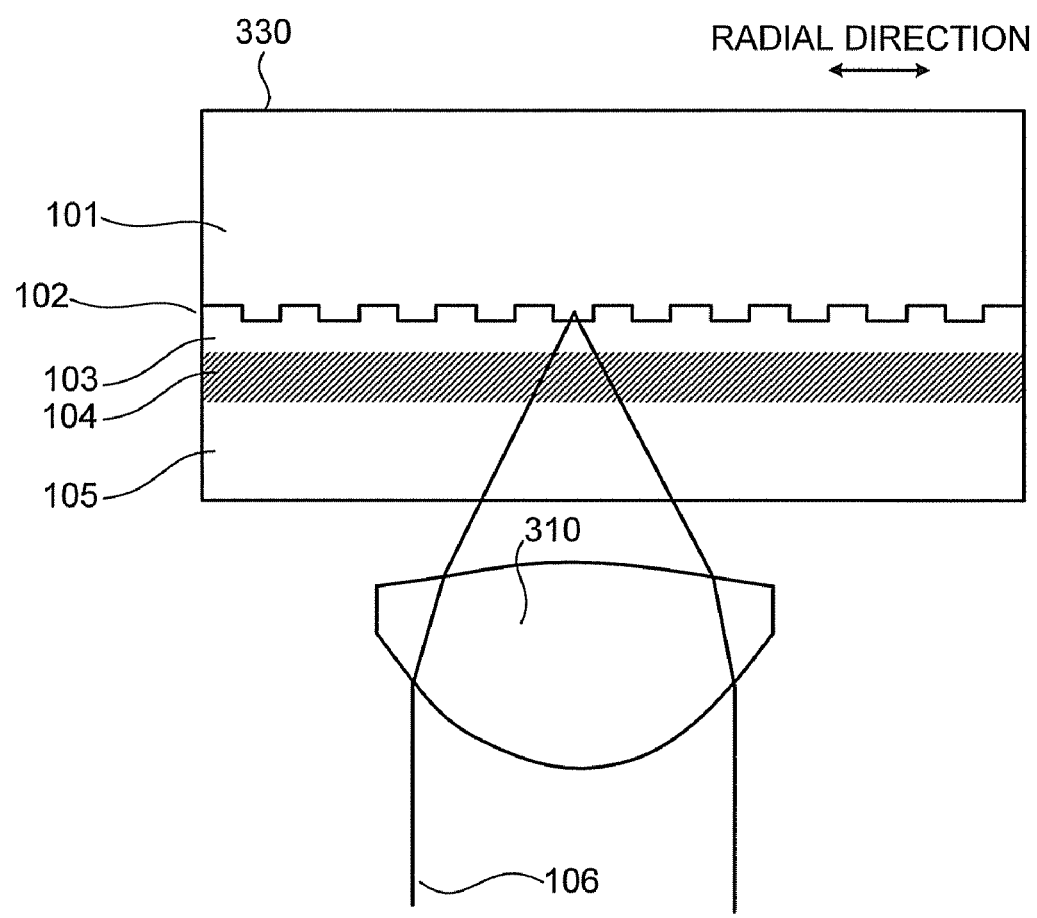
FIG. 1 is a cross sectional view of a holographic-optical-disk according to a first embodiment of the present invention.

Exemplary embodiments of the present invention are explained below in detail referring to the accompanying drawings. The present invention is not limited to the embodiments explained below. FIG. 1 is a cross sectional view of a holographic optical disk 330 according to a first embodiment. The holographic-optical-disk 330 includes a polycarbonate substrate 101, a transparent gap layer 103, a holographic-recording medium layer 104 in which information is recorded, and a protective layer 105 that protects the holographic-recording medium layer 104, layered in the order. The holographic-optical-disk 330 further includes a servo surface 102 formed on a surface of the substrate 101 that faces the holographic-recording medium layer 104, and the servo surface 102 includes guiding grooves or ridges (hereinafter, abbreviated as "patterns") or pits for focusing servo control, tracking servo control, and following-up servo control formed thereon. The state shown in FIG. 1 is that an objective lens 310 focuses a laser beam 106 on the servo surface 102.

The laser beam 106 transmits through the transparent gap layer 103. The gap layer 103 is formed by applying UV resin or the like on the substrate 101 by spin-coating method or the like. The gap layer 103 is provided to form a gap between the holographic-recording medium layer 104 and the servo surface 102 so that an interference area for the information beam and the reference beam is formed with a certain size in the holographic-recording medium layer 104 to control a size of the holograms generated therein.

The holographic-recording medium layer 104 is a layer recorded with holograms therein by interfering the information beam and the reference beam. The holographic-recording medium layer 104 is made of a material such as photopolymer. The photopolymer is a photosensitive material that takes advantage of photopolymerization of monomers, and generally includes a monomer, a photopolymerization initiator, and a porous matrix that retains volume of the photopolymer before and after recording information. Thickness of the holographic-recording medium layer 104 is a few hundreds of micrometers to achieve diffraction efficiency sufficient to play back signals.

A hologram is recorded in the holographic-recording medium layer 104 in the following manner. The information beam and the reference beam are overlapped in the holographic-recording medium layer 104 and the interference fringe pattern is formed. At this time, the photopolymerization initiator in the photopolymer is activated by absorbing photons, and promotes the polymerization of the monomer in the bright area of the interference fringe pattern. When the polymerization progresses and the monomer in the bright area is consumed, additional monomer is supplied from the dark area to the bright area, and thereby the density difference is generated between the bright area and the dark area of the interference fringe pattern. This forms the refractive index modulation corresponding to the intensity distribution in the interference fringe pattern, and this is how the holographic recording is performed.

Figure 2:
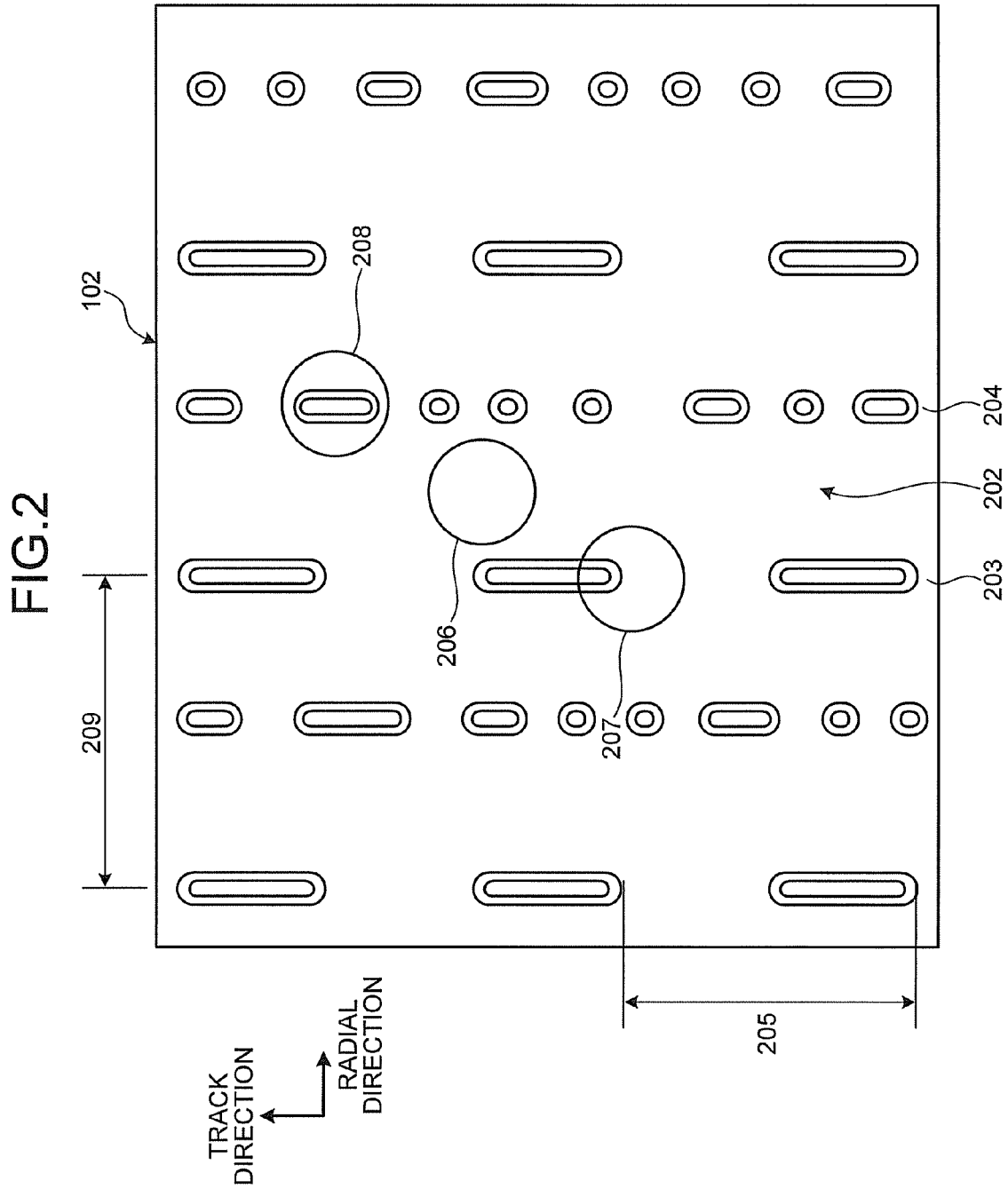
FIG. 2 is an enlarged top view of a servo surface according to a first embodiment.

The holographic-optical-disk 330 according to the first embodiment does not include a dichroic mirror layer that transmits a servo beam with a first wavelength therethrough and reflects a record-playback beam with a second wavelength between the substrate 101 and the holographic-recording medium layer 104. For this reason, an optical disk record-playback apparatus that records and plays back information in the holographic-recording medium layer 104 does not require a plurality of light sources to emit the servo beam and the record-playback beam 206. The holographic-recording medium layer 104 needs only one light source so that a single laser beam is divided into a recording beam and a servo beam having an identical wavelength. This simplifies an optical system in the optical disk record-playback apparatus. FIG. 2 is an enlarged top view of the servo surface 102. The servo surface 102 includes a following-up pit row 203 used for following-up servo control and an address pit row 204 recorded with address information and basic clock information that bases timing of each operation. A pair of the following-up pit row 203 and the address pit row 204 is arranged in parallel with each other extending in a circumferential direction of the holographic-optical-disk 330. A mirror surface 202 between the following-up pit row 203 and the address pit row 204 on the servo surface 102 is irradiated with the record-playback beam 206 and mirror-finished to reduce noise.

The following-up pit row 203 is a single-cycle pit row that includes a plurality of pits assuming the shift distance for shift-multiplex recording the hologram as a single cycle 205.

A distance 209 between two adjacent following-up pit rows 203 is equal to the shift distance for shift-multiplex recording so that a pair of the following-up pit row 203 and the address pit row 204 is arranged within the shift distance. The shift distance is at least three micrometers so as to sufficiently reduce crosstalk by an adjacent hologram. Because the distance is much longer than a 0.74 micrometer track pitch of a digital versatile disk read only memory (DVD-ROM) and the like, various preformatted signals such as servo signals, address signals, and disk information can be embedded in the area. The large area advantageously includes the following-up pit row 203 and the address pit row 204 arranged in parallel extending in the circumferential direction, and the various preformatted signals intermittently arranged on a single track.

To record the refractive index modulation in the holographic-recording medium layer 104 using the information beam and the reference beam, a certain time is required for exposure. When the holographic-optical-disk 330 rotates at a high speed during the recording, the exposure position moves and sharp interference fringe pattern cannot be generated. Because the fine refractive index modulation needs to be recorded using a photosensitive material with a high spatial resolution, misalignment during the exposure is a very serious problem for holographic recording.

Figure 18:
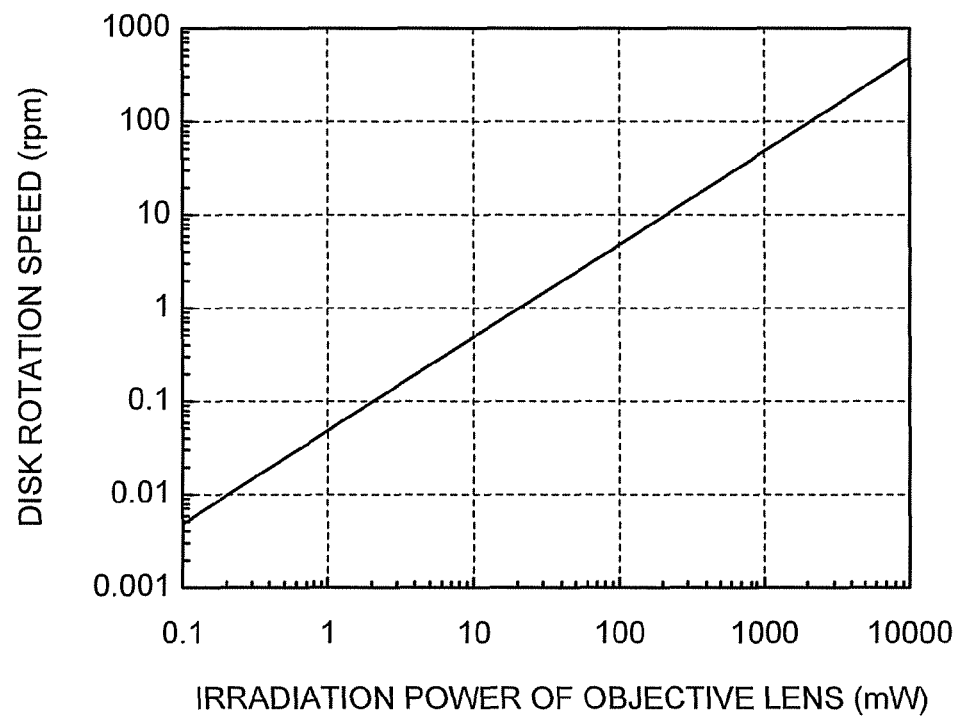
FIG. 18 is a chart for explaining relation between irradiation power of an objective lens and acceptable rotational speed of a disk.

FIG. 18 is a chart for explaining relation between irradiation power of the objective lens 310 and acceptable rotational speed of the disk assuming that the acceptable misalignment during the exposure is one micrometer. While an amount of energy required for the exposure depends on the recording medium, it is assumed herein five microjoules, and the exposure point on the disk is assumed 40 millimeters from the center of the disk. Taking into account that the optical disk record-playback apparatus will be produced as a commercial product, it is desired to use a small and low-power semiconductor laser as a source of the record-playback beam 206. If the semiconductor laser is used and the irradiation power of the objective lens is a reasonable value of 100 milliwatts, as seen in FIG. 18, the acceptable rotational speed is as low as 4.8 rpm. When the rotational speed is so low, it takes some time to shift from the recording operation to the playing back operation.

As described above, because the following-up pit row 203 and the address pit row 204 are arranged in parallel on the holographic-optical-disk 330, the optical disk record-playback apparatus emits laser beams to the following-up pit row 203 and the address pit row 204 at a time, whereby performing following-up servo control and the holographic recording at a time. The following-up servo control is to control the beam spots by shifting those of the laser beam in accordance with the rotation of the holographic-optical-disk 330 so that the relative velocity between the radiating positions and the holographic-optical-disk 330 is substantially zero. "Substantially zero" herein means a value within a tolerance for recording a hologram in the holographic-recording medium layer 104, unless otherwise specified.

Figure 3:
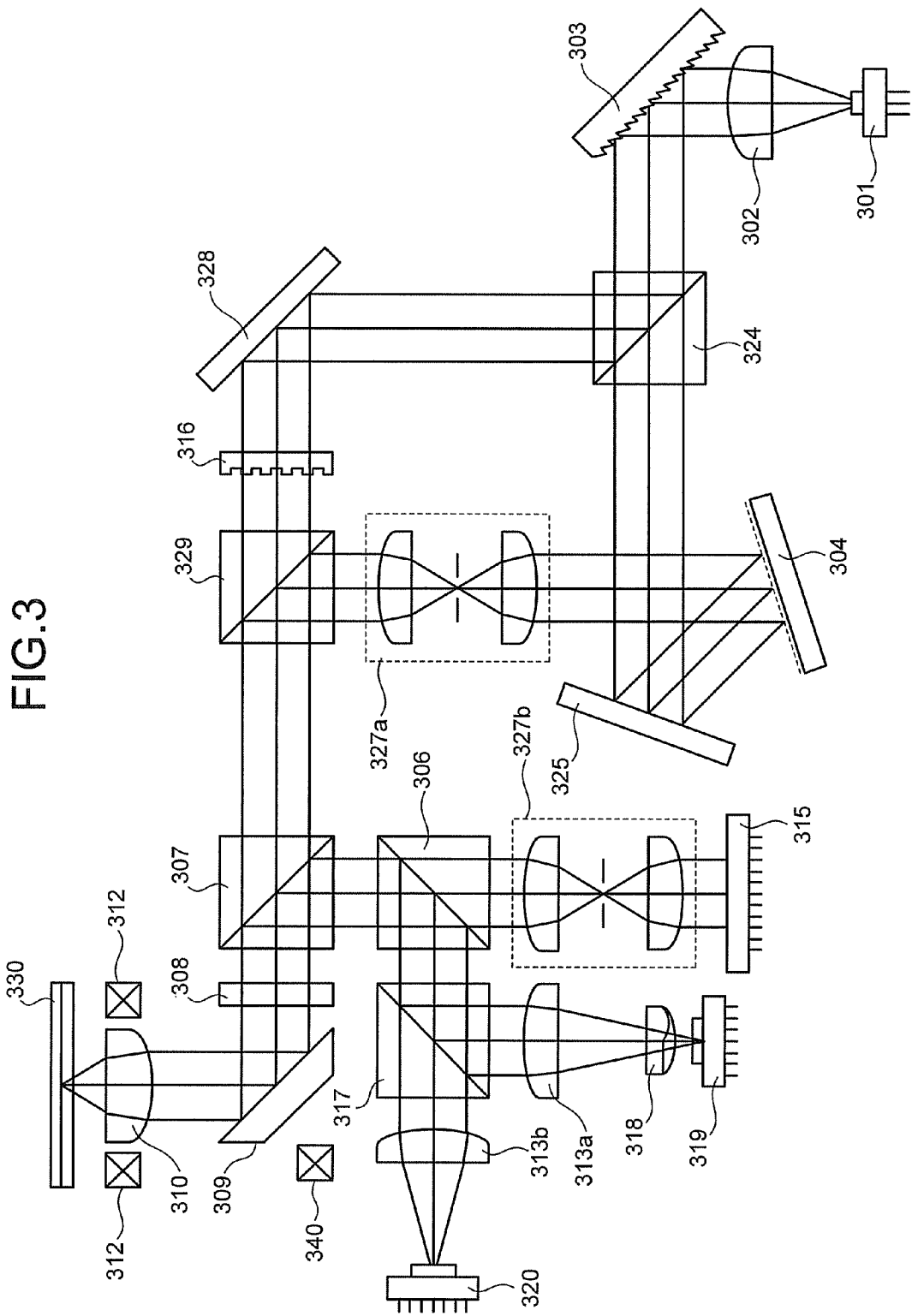
FIG. 3 is a schematic view for explaining a configuration of an optical system in a holographic-optical-disk record-playback apparatus according to the first embodiment.

Focusing servo control, tracking servo control, and following-up servo control are performed by dividing a laser beam from a single light source into the servo beam and the record-playback beam 206, further dividing the servo beam into a diffracted beam 208 that is a plus-first order beam and a diffracted beam 207 that is a minus-first order beam using a diffraction grating, and emitting the diffracted beam 207 to the following-up pit row 203 and the diffracted beam 208 to the address pit row 204 at the same time. When following-up servo control is performed and the diffracted beam 207 irradiates an end of each pit on the following-up pit row 203, the record-playback beam 206 records a hologram in the holographic-recording medium layer 104. More specifically, the hologram is recorded when the center of the area irradiated by the diffracted beam 207 reaches the end of each pit. FIG. 3 is a schematic view for explaining a configuration of an optical system in a holographic-optical-disk record-playback apparatus according to the first embodiment.

The optical system in the record-playback apparatus for holographic-optical-disk includes a semiconductor laser 301 that emits a laser beam, a collimating lens 302, a diffraction grating 303 as a resonator, beam splitters 324, 306, and 317, mirrors 325 and 328, a spatial light modulator 304, spatial filters 327a and 327b, a diffraction grating 316, a cubic prism 329, a polarization beam splitter 307, a quarter-wave plate 308, a reflecting mirror 309, the objective lens 310, condenser lenses 313a and 313b, a cylindrical lens 318, photodetectors 319 and 320, and a complementary metal oxide semiconductor (CMOS) solid-state image sensor 315. An actuator 312 and a following up actuator 340 are also shown in FIG. 3 as part of a servo system, which will be explained later.

The semiconductor laser 301 emits a laser beam, preferably a blue-violet laser with the wavelength in the 405 nanometer bandwidth in view of availability of semiconductor lasers and design freedom. Otherwise, a semiconductor laser that emits a green laser in the 532 nanometer bandwidth can be used as the semiconductor laser 301.

The linearly polarized beam emitted from the semiconductor laser 301 is converted from a diverging beam to a parallel beam by the collimating lens 302. The semiconductor laser 301 can cause a mode-hopping phenomenon that an oscillating wavelength fluctuates due to change of the operating temperature or the electric current; however, the mode-hopping phenomenon is not desirable for holographic-optical-disks that allow a very tight margin for the shift of the wavelength.

To prevent the mode-hopping phenomenon, the diffraction grating 303 is disposed right after the collimating lens 302, and the beam diffracted by the diffraction grating 303 returns to the semiconductor laser 301 to form a resonator that oscillates at a desired wavelength. The record-playback apparatus for holographic-optical-disk according to the first embodiment uses a simple Littrow resonator to return first-order diffracted beams to the semiconductor laser 301 and extracts a zeroth-order diffracted beam with a stable wavelength. However, a Littman resonator can be used for the diffraction grating 303 instead of the Littrow resonator. If a distributed-feed-back (DFB) laser having little shift of the wavelength and a long coherence length is put into practical use in future, use of the DFB laser as the semiconductor laser 301 will require no diffraction grating 303.

The zeroth order beam from the diffraction grating 303 enters the beam splitter 324, which divides the zeroth order beam into a transmitting beam and a reflected beam at a predetermined proportion of the light intensity. The transmitted beam is used as the record-playback beam 206, and the reflected beam is used as the servo beam.

The record-playback beam 206 transmitted through the beam splitter 324 is reflected by the mirror 325, and enters the spatial light modulator 304. The spatial light modulator 304 performs optical intensity modulation and converts the record-playback beam 206 to the reference beam and the information beam. While a digital micromirror device is used as the spatial light modulator 304 according to the first embodiment, other devices such as a liquid crystal device or a ferroelectric liquid crystal device as responsive as a few tens microseconds can be used.

Figure 4A:
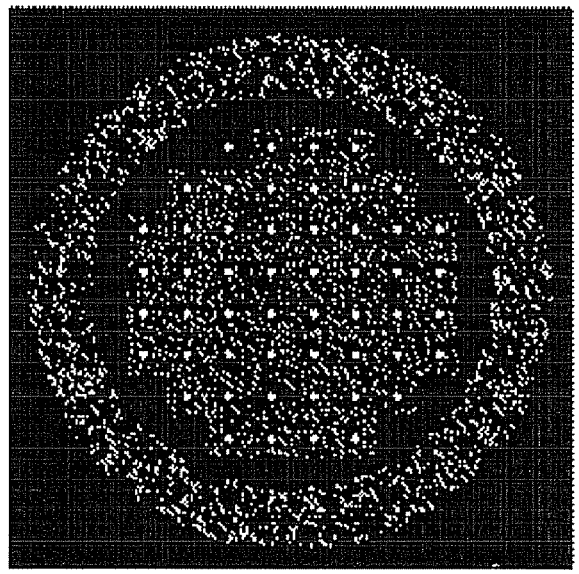
FIG. 4A is a schematic view for explaining a modulation pattern for recording a reference beam and an information beam.
Figure 4B:
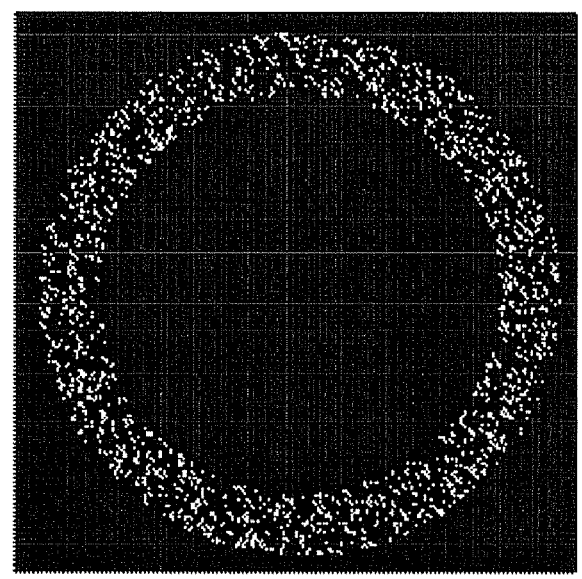
FIG. 4B is a schematic view for explaining a modulation pattern for playing back a reference beam and an information beam.

FIGS. 4A and 4B are schematic views for explaining modulation patterns of the reference beam and the information beam using the spatial light modulator 304. FIG. 4A shows a recording pattern, and FIG. 4B shows a playing back pattern.

The information pattern includes a binary pattern that includes digitally encoded information and error correction codes. The data amount in the information beam area is about 10 to 20 kilobits per frame, though it depends on the performance of the spatial light modulator 304, the pixel count of the image sensor, and the encoding method. While the first embodiment uses the binary pattern of "0" and "1", a multi-numbered pattern can also be used. The multi-numbered pattern includes an extremely increased amount of data per frame.

The spatial filter 327a includes two lenses and a pinhole. The reference beam and the information beam emitted from the spatial light modulator 304 enter the spatial filter 327a to be cleared of unnecessary high-order diffracted lights.

After being emitted from the spatial filter 327a, the reference beam and the information beam enter the cubic prism 329.

On the other hand, the servo beam reflected by the beam splitter 324 is reflected by the mirror 328 and enters the diffraction grating 316 without receiving optical intensity modulation by the spatial light modulator 304. Because the beam splitter 324 divides the laser beam into the record-playback beam 206 and the servo beam, and only the record-playback beam 206 receives optical intensity modulation to generate the information beam and the reference beam, various servo signals acquired from the reflection of the servo beam from the holographic-optical-disk 330 include a reduced amount of noise caused by the record-playback beam 206.

The servo beam is diffracted by the diffraction grating 316, and divided into three diffracted beams; a zeroth order beam, a plus-first order beam, and a minus-first order beam. The plus-first order beam and the minus-first order beam are used as the servo beams, while the zeroth order beam is not used as the servo beam. According to the first embodiment, the plus-first order beam is the diffracted beam 208 that irradiates the address pit row 204 on the servo surface, and the minus-first order beam is the diffracted beam 207 that irradiates the following-up pit row 203. However, the minus-first order beam can be used as the diffracted beam 208 that irradiates the address pit row 204, and the plus-first order beam can be used as the diffracted beam 207 that irradiates the following-up pit row 203.

Figure 5A:
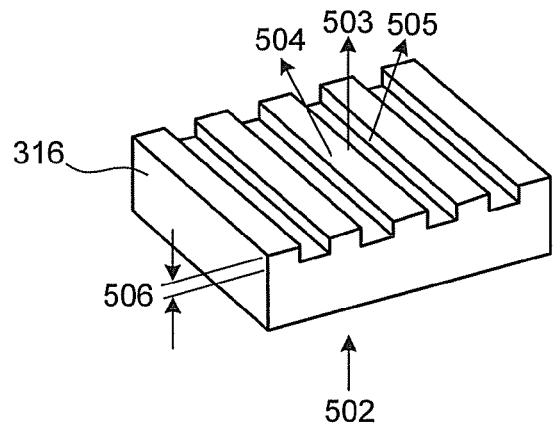
FIG. 5A is a perspective view of a diffraction grating.
Figure 5B:
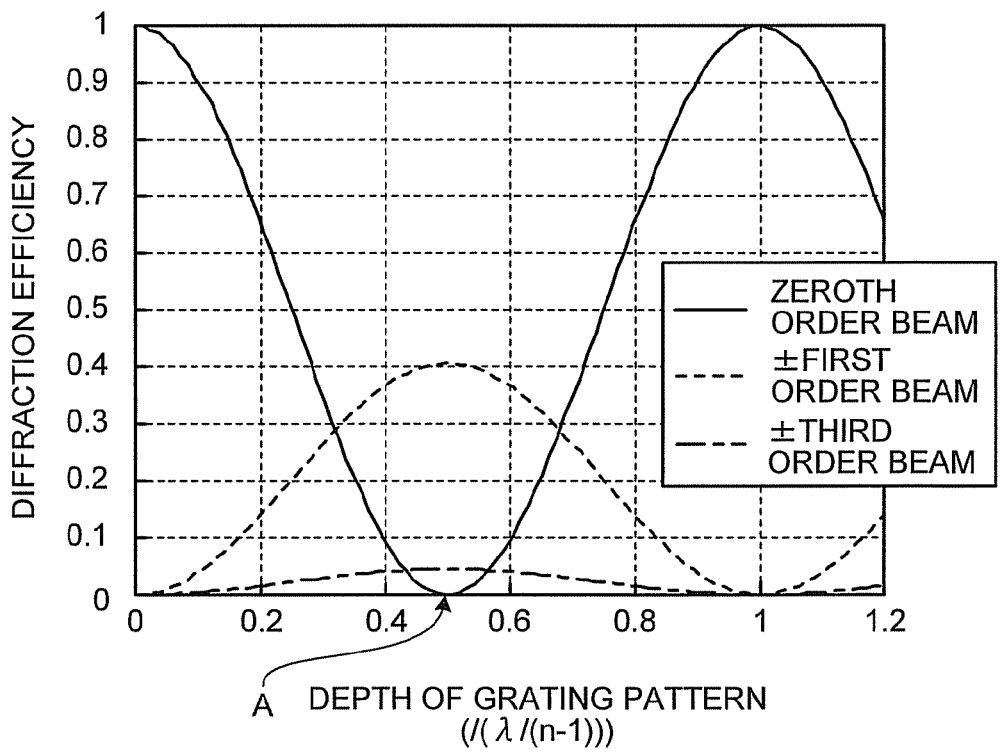
FIG. 5B is a chart of diffraction efficiency of diffracted beams for three different orders versus pattern depth of the diffraction grating.

The diffraction grating 316 is a common diffraction grating that has a rectangular cross section of the grating. The depth of the grating pattern is designed to an optimum value to improve the light use efficiency by suppressing the diffraction efficiency of the zeroth order beam that is not used as the servo beam. FIG. 5A is a perspective view of the diffraction grating, and FIG. 5B is a chart of the diffraction efficiency of the diffracted beams of three different orders versus pattern depth of the diffraction grating 316. In FIG. 5A, a servo beam 502 enters the diffraction grating 316, and a zeroth order beam 503, a plus-first order beam 505, and a minus-first order beam 504 are emitted from the diffraction grating 316. In FIG. 5B, the horizontal axis indicates the depth of the grating pattern, the vertical axis indicates the diffraction efficiency, a solid curve represents the diffraction efficiency of the zeroth order beam 503, and a dotted curve represents the diffraction efficiency of the plus-first order beam 505 and the minus-first order beam 504. A dashed-dotted curve represents the diffraction efficiency of plus/minus-third order beams.

As pointed by an arrow A in FIG. 5B, when a grating pattern depth 506 is $\lambda/(n-1)/2$, the diffraction efficiency of the zeroth order beam 503 is substantially zero, where emission of the zeroth order beam 503 does not effect the servo surface 102. The $\lambda$ represents the wavelength of the servo beam 502, and the n represents the refractive index of the substrate 101.

The plus-first order beam 505 and the minus-first order beam 504 from the diffraction grating 316 are depicted as a single beam in FIG. 3 for convenience of explanation. By using a polarizing diffraction grating as the diffraction grating 316, each beam is polarized only when it proceeds toward the holographic-optical-disk 330, whereby further improving the light use efficiency.

The diffracted beams 207 and 208 divided into the plus and minus first orders enter the cubic prism 329 and are multiplexed with the information beam and the reference beam in the record-playback beam 206 emitted from the spatial filter 327a. The multiplexed beam that includes the zeroth order beam of the information beam and the reference beam and the diffracted beam of the servo beam 502 is circularly polarized by the quarter-wave plate 308, reflected by the reflecting mirror 309, and condensed on the holographic-optical-disk 330 by the objective lens 310. In this manner, each of the record-playback beam 206 that is the zeroth order beam, the diffracted beam 207, and the diffracted beam 208 forms a beam spot on the servo surface 102.

The laser beam that includes the record-playback beam 206, the diffracted beam 207, and the diffracted beam 208 reflected by the holographic-optical-disk 330 proceeds through the objective lens 310 in the opposite direction, and is converted by the quarter-wave plate 308 to linearly polarized beams that cross the former linearly-polarized beams at right angles. The linearly-polarized reflected beam is reflected by the polarization beam splitter 307, and enters the beam splitter 306. The beam splitter 306 divides the reflected beam into a reflected beam and a transmitted beam at a predetermined proportion of the light intensity, and the transmitted beam enters the spatial filter 327b. The spatial filter 327b removes the diffracted beams 207 and 208 from the reflected beam and extracts the record-playback beam 206 that is accepted by the CMOS solid-state image sensor 315 as a two-dimensional image.

On the other hand, the beam reflected by the beam splitter 306 is used as a servo reflected beam. The servo reflected beam enters the beam splitter 317 and is divided into a reflected beam and a transmitted beam at a predetermined proportion of the light intensity.

The beam reflected by the beam splitter 317 is converted from a parallel beam to a convergent beam by the condenser lens 313a, is diffracted at and transmits through the cylindrical lens 318, and is condensed by the photodetector 319. The photodetector 319 converts optical power of the condensed beam to electrical signals. A beam spot condensed by the photodetector 319 performs focusing servo control by driving the actuator 312.

The beam transmitted through the beam splitter 317 is converted from a parallel beam to a convergent beam by the condenser lens 313b, and condensed by the photodetector 320. A beam spot condensed by the photodetector 320 performs tracking servo control by driving the actuator 312, and performs the track-focusing servo control by driving the following up actuator 340. Focusing servo control, tracking servo control, and following up servo control will be detailed later.

Figure 6:
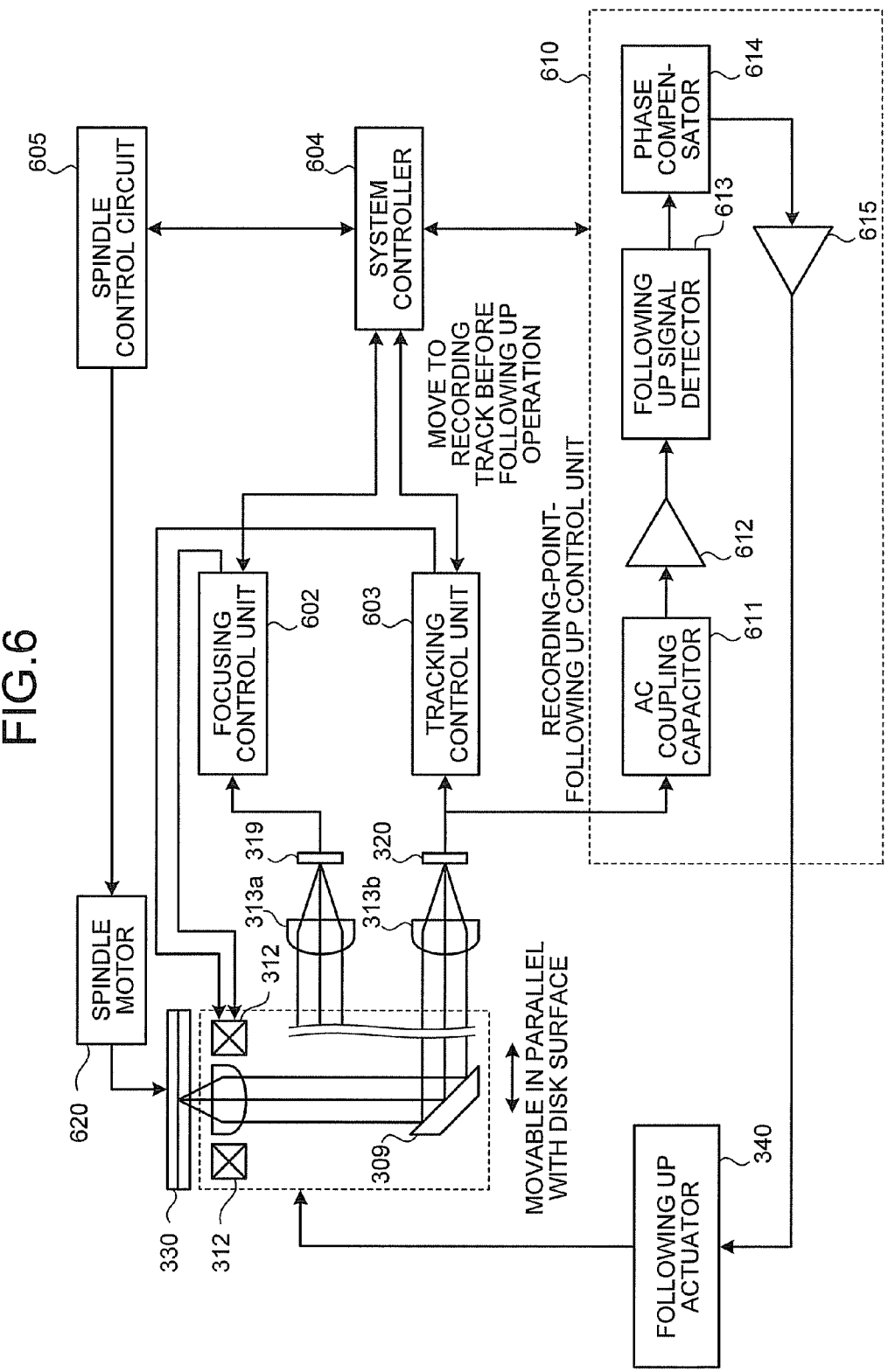
FIG. 6 is a block diagram of a servo system in the record-playback apparatus for holographic-optical-disk according to the first embodiment.

FIG. 6 is a block diagram of the servo system in the optical disk record-playback apparatus according to the first embodiment. The record-playback apparatus for an optical disk includes a spindle motor 620, a spindle control circuit 605, the actuator 312, a focusing control unit 602, a tracking control unit 603, the following up actuator 340, a following up control unit 610, and a system controller 604.

The spindle motor 620 rotates the holographic-optical-disk 330, and the spindle control circuit 605 controls the rotation of the spindle motor 620.

The actuator 312 moves the objective lens 310 in the radial direction and the track direction of the disk (horizontal directions in FIG. 6) and in the direction vertical to the disk (longitudinal direction in FIG. 6) according to instructions from the focusing control unit 602 and the tracking control unit 603. The focusing control unit 602 performs focusing servo control of the objective lens 310 by driving the actuator 312 based on the beam spot detected by the photodetector 319. The tracking control unit 603 performs tracking servo control by driving the actuator 312 based on the beam spot detected by the photodetector 320. The following up actuator 340 moves the objective lens 310 and the reflecting mirror 309 as a unit in the track direction of the disk based on the instruction from the following up control unit 610.

The following up control unit 610 performs following-up servo control by driving the following up actuator 340 based on the beam spot detected by the photodetector 320. The following up actuator 340 is driven so that the irradiation positions of the diffracted beams 207 and 208 and the record-playback beam 206 follow the rotation of the holographic-optical-disk, i.e. so that the relative velocity between the holographic-optical-disk 330 and the irradiation positions is substantially zero. The system controller 604 issues various instructions to the spindle control circuit 605, the focusing control unit 602, the tracking control unit 603, and the following up control unit 610.

The focusing control unit 602 performs focusing servo control based on astigmatism in the following manner. The reflected beam condensed on the photodetector 319 represents an ellipse depending on the focus error of the beam spot condensed on the holographic-optical-disk 330. The direction of the longitudinal axis of the ellipse varies depending on the direction of the focus error. Taking advantage of this nature, the focusing control unit 602 generates focus error signals and issues an instruction to the actuator 312 based on the focus error signals, and the actuator 312 drives the objective lens 310 in the vertical direction toward the holographic-optical-disk 330 to focus the laser beam on the servo surface 102. While the record-playback apparatus according to the first embodiment uses the astigmatism method as a typical method of detecting the focus error, another method such as a knife edge method or a beam size method can be used.

Tracking servo control and following-up servo control are based on the beam spot of the reflection detected by the photodetector 320.

FIG. 7 is a schematic view for explaining a configuration of acceptance surfaces of the photo detector 320, arrangement of the beam spot on each of acceptance surfaces, and signal circuits that generate tracking-error signals and following up signals from reflected beams. The reflection of the diffracted beam 207 for servo control from the servo surface 102 shown in FIG. 2 enters a acceptance surface 704 to form a beam spot 702, and the reflection of the diffracted beam 208 for servo control from the servo surface 102 enters a acceptance surface 705 to form a beam spot 703. For convenience of explanation, a beam spot 701 is also shown in FIG. 7. The beam spot 701 is formed when the reflection of the record-playback beam 206 is accepted by the CMOS solid-state image sensor 315.

The acceptance surface 704 of the photo detector 320 is divided into four sectional acceptance surfaces 704a to 704d. A trace signal of signals from the beam spots on the sectional acceptance surfaces 704a and 704c is added to a trace signal of signals from the beam spots on the sectional acceptance surfaces 704b and 704d by an adding circuit 721. A resulting multiple signal 706 is AC-coupled by an AC coupling capacitor 611, which outputs an alternating component as a following up signal 707. The following up signal 707 is amplified by an amplifier 612 and detected by a following up signal detector 613 in the following up control unit 610. After oscillation is prevented by a phase compensation circuit 614 that controls the phase, the following up signal 707 is further amplified by an amplifier 615 and output to the following up actuator 340.

Figure 8A:
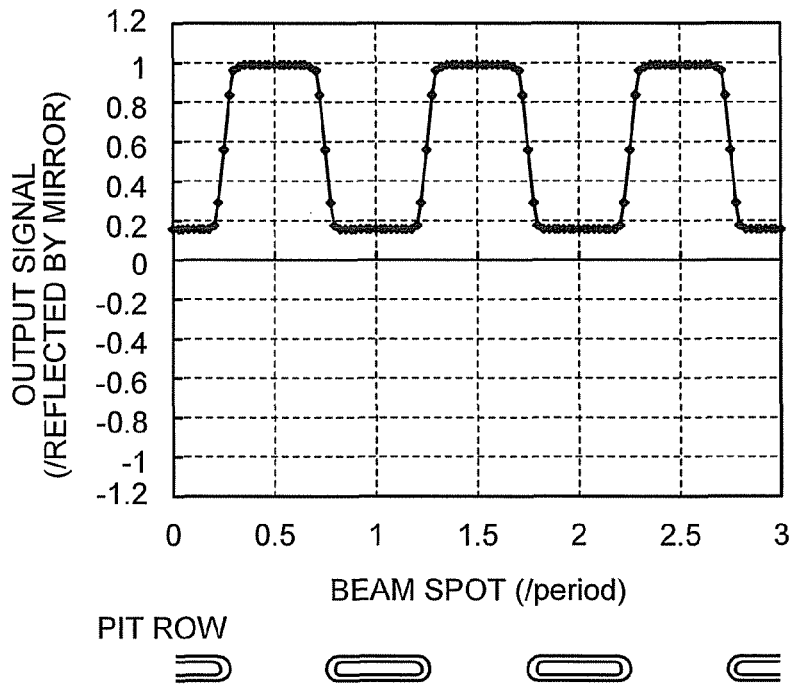
FIGS. 8A and 8B are schematic views for explaining states of signals acquired from reflection of a beam diffracted from a servo laser beam that irradiates a following-up pit row.
Figure 8B:
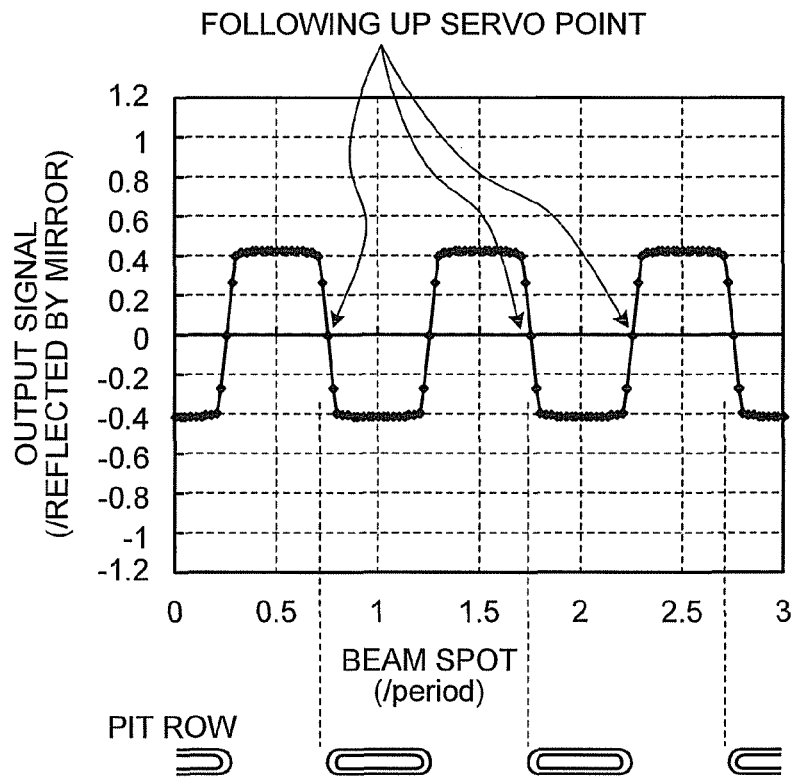

FIGS. 8A and 8B are schematic views for explaining states of signals acquired from the reflection of the diffracted beam 207 from the servo beam 502 irradiated to the following-up pit row 203. States of the signals acquired by computer simulation are plotted in FIGS. 8A and 8B. The horizontal axis indicates positions of the diffracted beam 207 aiming at a coordinate fixed on the holographic-optical-disk 330, and the vertical axis indicates the signal intensity level. The output signal shown in FIG. 8A is the multiple signal 706 acquired from the beam spot on the acceptance surface 704, and the output signal shown in FIG. 8B is the following up signal 707 acquired by AC-coupling the multiple signal 706.

The analysis was performed based on the pit width and the pit depth equal to those of a DVD-ROM assuming that a numerical aperture (NA) of the objective lens 310 is 0.5, the pit length is five micrometers, and the repetition cycle is 10 micrometers. The result shows periodic signals that have the maximum value of substantially 100 percent when the beam spot is in the mirror surface 202 where no pit is present, and that the minimum value of about 15 percent when the beam spot is at the center of the pit. Each of FIGS. 8A and 8B includes three cycles of the pits in the following-up pit row 203. The zero cross point of the output signal 707 arrowed in FIG. 8B corresponds to the end of each pit being irradiated by the diffracted beam 207.

This means that holographic recording in the holographic-recording medium layer 104 can be performed by emitting the record-playback beam 206 from the semiconductor laser 301 while the following up control unit 610 performs following-up servo control at the zero cross point by making the diffracted beams 207 and 208 follow the rotation of the holographic-optical-disk 330.

More specifically, the diffracted beam 208 irradiates the address pit row 204 and the diffracted beam 207 irradiates the following-up pit row 203 at the same time, the tracking control unit 603 performs tracking control, and the tracking control unit 603 acquires the address signal to read the recording point from it. The following up control unit 610 then drives the following up actuator 340 to move the objective lens 310 and the reflecting mirror 309 to move the irradiation positions of the diffracted beams 207 and 208 and the record-playback beam 206, so that the following up signal of the reflection of the diffracted beam 207 from the following-up pit row 203 is substantially zero. "The following up signal is Substantially zero" herein means that the following up signal is within a tolerance for recording a hologram in the holographic-recording medium layer 104, unless otherwise specified.

According to the computer simulation, the sensitivity of the servo signal is 1.44/μm, which is very high. The sensitivity of the servo signal herein (inclination near the zero cross point) is defined as an amount changed per tracing distance by the beam spot in the track direction when the signal amount is normalized on the timing of the reflection on the mirror surface. The highly sensitive signal enables the holographic recording by accurately aligning the beam spots to the recording point.

The tracking control unit 603 performs tracking servo control by a differential phase detection (DPD) method that is used for the DVD-ROM and the like and another method that uses signal intensity of the reflection from the following-up pit row 203.

More specifically, the tracking control unit 603 performs tracking servo control using the signal intensity when following-up servo control is performed. When following-up servo control is not performed, the tracking control unit 603 performs tracking servo control by the DPD method.

A trace signal of signals from the beam spots on the sectional acceptance surfaces 704a and 704c and a trace signal of signals from the beam spots on the sectional acceptance surfaces 704b and 704d are input to a differential amplifier 722. The differential amplifier 722 computes a difference between the two traces, and a differential signal 708 is output as a tracking error signal.

On the other hand, the acceptance surface 705 is divided into four sectional acceptance surfaces 705a to 705d. The reflection of the diffracted beam 208 forms the beam spot 703 divided into four sections on the sectional acceptance surfaces 705a to 705d. A trace signal of signals from the beam spots on the sectional acceptance surfaces 705a and 705c and a trace signal of signals from the beam spots on the sectional acceptance surfaces 705b and 705d are AC-coupled by capacitors 731 and 732 in the tracking control unit 603. Resulting signals 709 and 710 including alternating component of each trace signal are input to level comparators 723 and 724 respectively, and signals 711 and 712 digitalized by the level comparators 723 and 724 are input to a phase comparator 725. Signals 713 and 714 output from the phase comparator 725 are accumulated by accumulators 726 and 727 respectively at a predetermined interval, and input to a differential amplifier 728. The differential amplifier 728 outputs a DPD signal 715 indicative of phase difference between the two trace signals.

When following-up servo control starts, based on an instruction to start following-up servo control from the system controller 604, the tracking control unit 603 connects a switch 729 to the differential amplifier 722, and inputs the differential signal 708 to start tracking servo control.

When following-up servo control is terminated, based on an instruction to terminate following-up servo control from the system controller 604, the tracking control unit 603 connects the switch 729 to the differential amplifier 728 that is connected to the phase comparator 725, and inputs the DPD signal 715 to perform tracking servo control by the DPD method.

The two methods of tracking servo control are used for the following reason. During following-up servo control, because the relative velocity between the holographic-optical-disk 330 and the beam spots is substantially zero, the DPD signal indicative of the tracking error cannot be generated if there is a tracking error, and therefore tracking servo cannot be performed.

Figure 9:
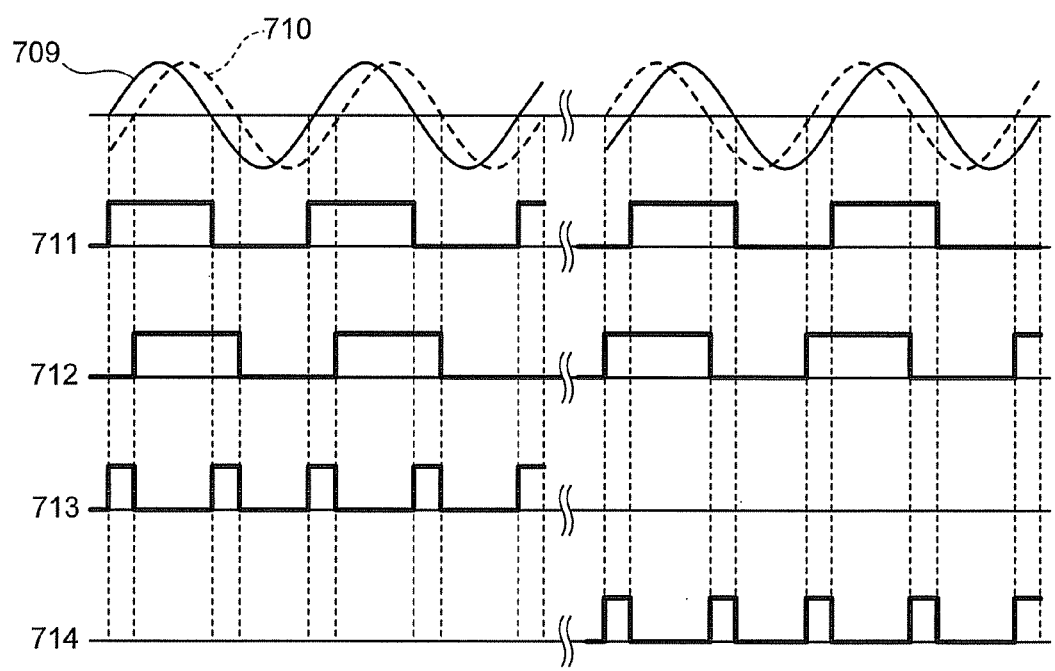
FIG. 9 is a chart for explaining states of signals when DPD signals are generated.

FIG. 9 is a chart for explaining states of signals when DPD signals are generated. The horizontal axis indicates time, and the vertical axis indicates amplitude of each signal. The signals shown in FIG. 9 are the signals 709 and 710 that are alternating components of the two trace signals from the acceptance surface 705, the signals 711 and 712 output from the level comparators 723 and 724 based on the signals 709 and 710, and the signals 713 and 714 output from the phase comparator 725 based on the signals 711 and 712.

When the relative velocity between the holographic-optical-disk 330 and the beam spots is substantially zero, output of the signals stops at a certain time as shown in FIG. 9, and therefore the DPD signal 715 cannot be generated during this time.

For this reason, the tracking control unit 603 according to the first embodiment performs tracking servo control using the differential signal 708 during following-up servo control and performs tracking servo control by the DPD method using the DPD signal 715 when following-up servo control is not performed. This realizes stable tracking servo control no matter following-up servo control is performed.

The differential signal 708 is used during following-up servo control for the following reason.

Figure 10:
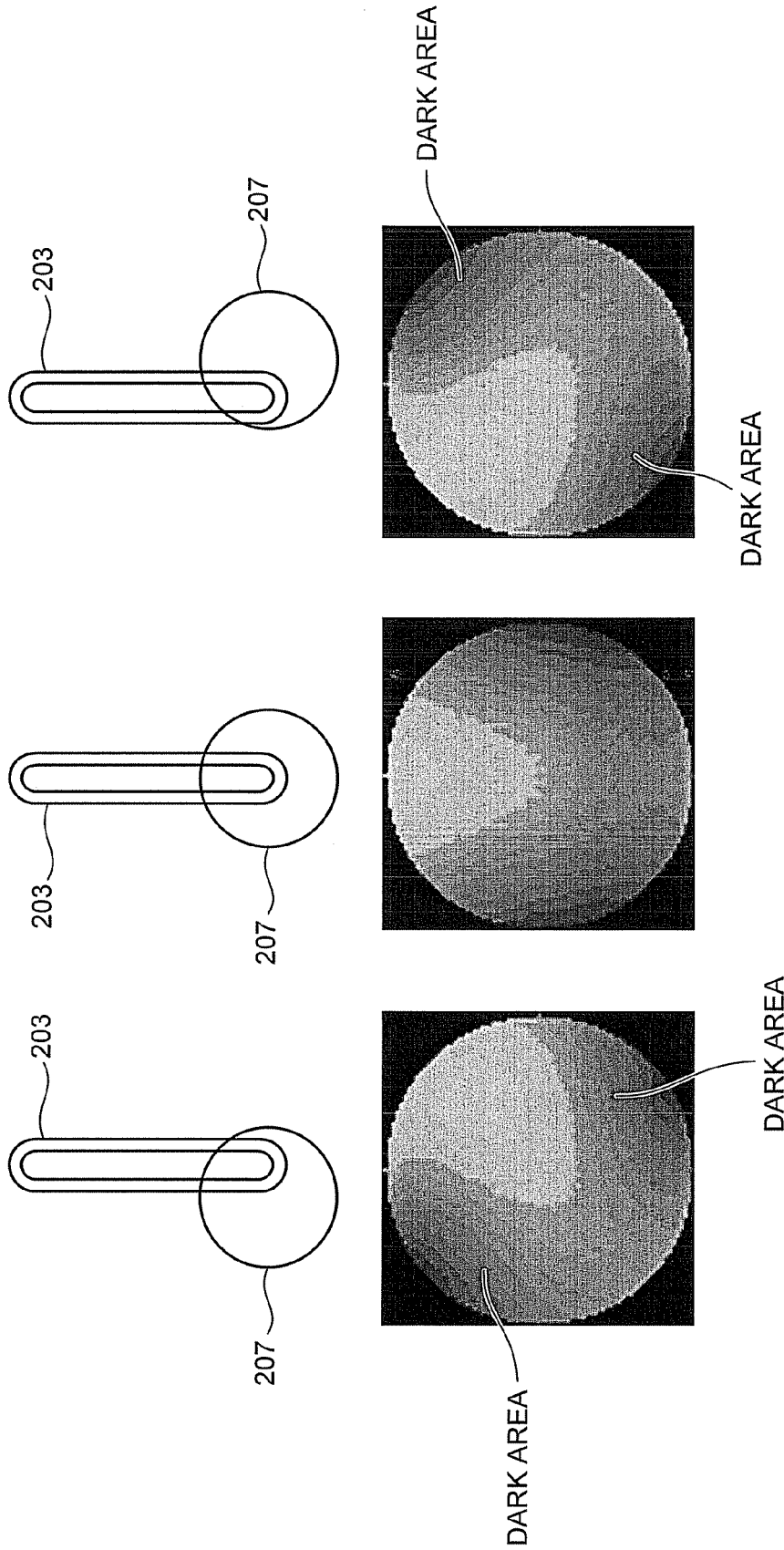
FIG. 10 is a schematic view for explaining positions of a beam spot of a diffracted beam on a pit end of the following-up pit row and distribution of the light intensity in the beam spot of a reflection of the diffracted beam accepted by a photodetector.

FIG. 10 is a schematic view for explaining the irradiation position of the beam spot of the diffracted beam 207 on a pit end of the following-up pit row 203 and distribution of light intensity in the beam spot 701 of the reflection of the diffracted beam 207 accepted by the photodetector 320. A left image corresponds to misalignment of the beam spot to the left, a central image corresponds to a case that the beam spot is properly aligned, and a right image corresponds to misalignment of the beam spot to the right.

When the beam spot is misaligned, there are dark areas in opposing corners of the acceptance surface 704, and polarity is reversed according to direction of the misalignment. In other words, presence and position of the dark areas changes depending on only the position of the beam spot on a pit, and the occurrence and direction of the misalignment is detected if the relative velocity between the following-up pit row 203 and the beam spot is substantially zero during following-up servo control. Whether the beam spot is misaligned and the direction in which the beam is misaligned can be determined by using the trace signal from the quartered acceptance surface 704. For this reason, tracking servo control is performed using the differential signal 708 as the tracking error signal during following-up servo control.

Figure 11:
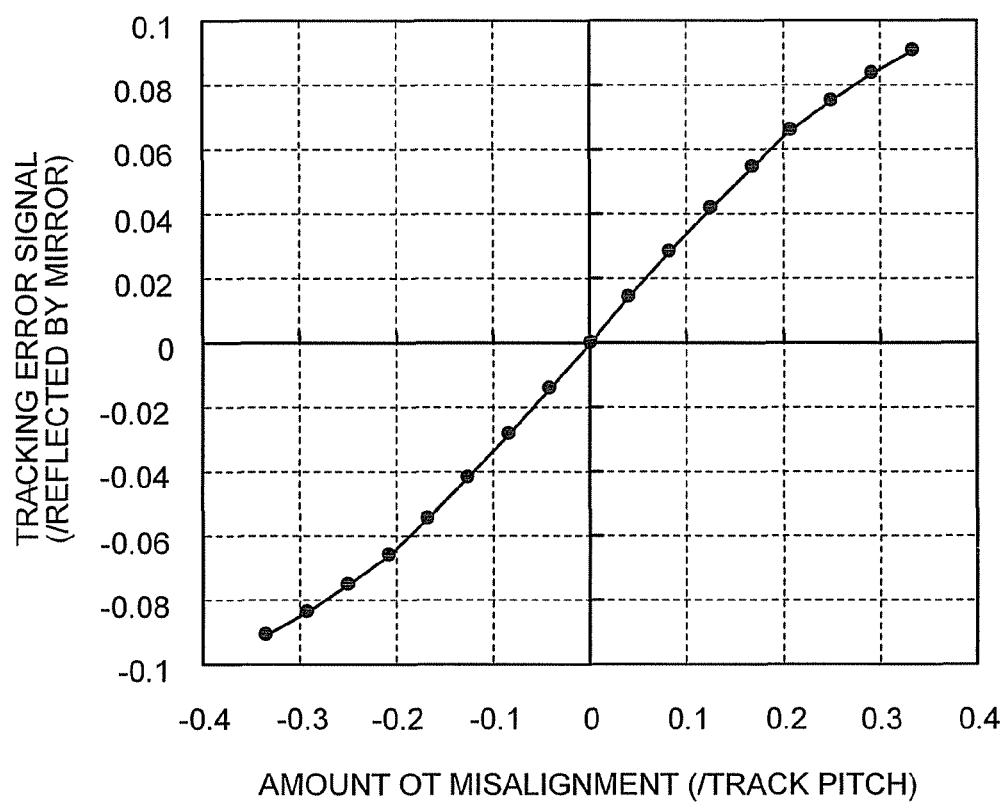
FIG. 11 is a chart indicative of tracking error signals while following-up servo control is performed using differential signals.

FIG. 11 is a chart of tracking error signals when following-up servo control is performed using the differential signal 708. The horizontal axis indicates amount of the misalignment assuming a track pitch as 10 micrometers, and the vertical axis indicates the tracking error signal. Use of the differential signal 708 provides the tracking error signal that enables tracking servo control.

Figure 12A:
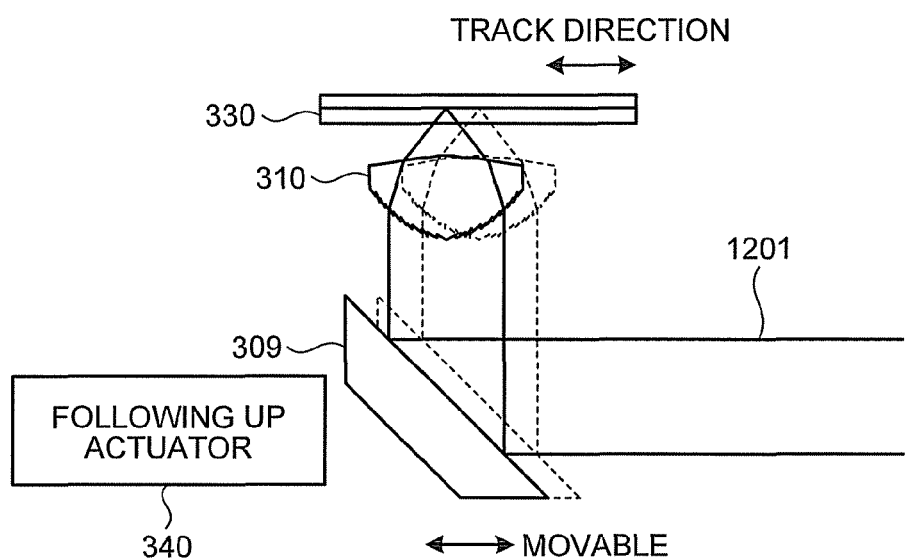
FIG. 12A is a schematic view for explaining a method of moving a beam spot of a laser beam on the holographic-optical-disk using a following up actuator.

FIG. 12A is a schematic view for explaining a method of moving the irradiation positions of the diffracted beams 207 and 208 and the record-playback beam 206 on the holographic-optical-disk 330 using the following up actuator 340.

The record-playback apparatus for holographic-optical-disk according to the first embodiment is configured to drive the reflecting mirror 309 and the objective lens 310 as a unit in the track direction of the holographic-optical-disk 330 (in the lateral direction in FIG. 12A). Both of the record-playback beam 206 and the servo beam 502 are indicated as a beam 1201 in FIG. 12A for convenience of explanation.

Figure 12B:
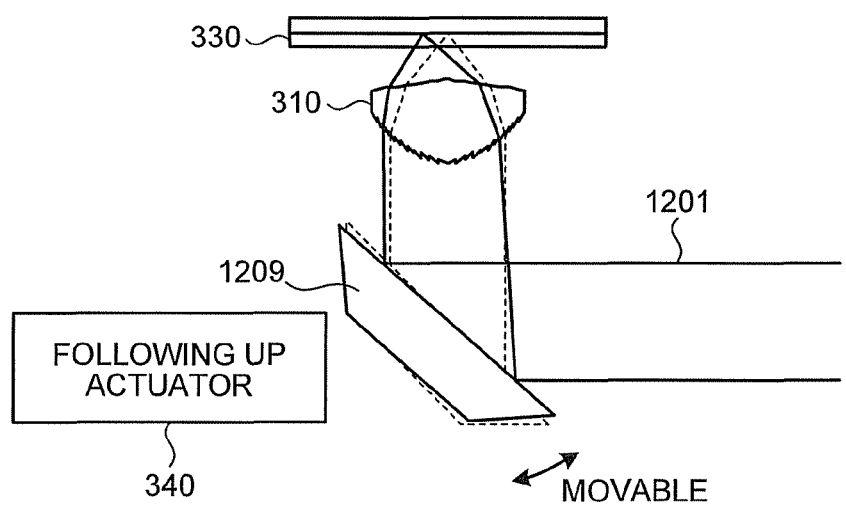
FIG. 12B is a schematic view for explaining another method of moving a beam spot of a laser beam on the holographic-optical-disk using a following up actuator.

While the beam spot is shifted by the following up actuator 340 that moves the reflecting mirror 309 and the objective lens 310 as a unit in the track direction according to the first embodiment, the record-playback apparatus for holographic-optical-disk is not limited to use the same shifting method. For example, as shown in FIG. 12B, the record-playback apparatus can use a galvanometer mirror 1209 instead of the reflecting mirror 309, and move the beam spot by rotating the galvanometer mirror 1209 without moving the objective lens 310. This method is applicable when the travel distance of the irradiation position is short and the aberration generated by an oblique incidence of the beam into the objective lens 310 is within a predetermined tolerance.

Figure 13:
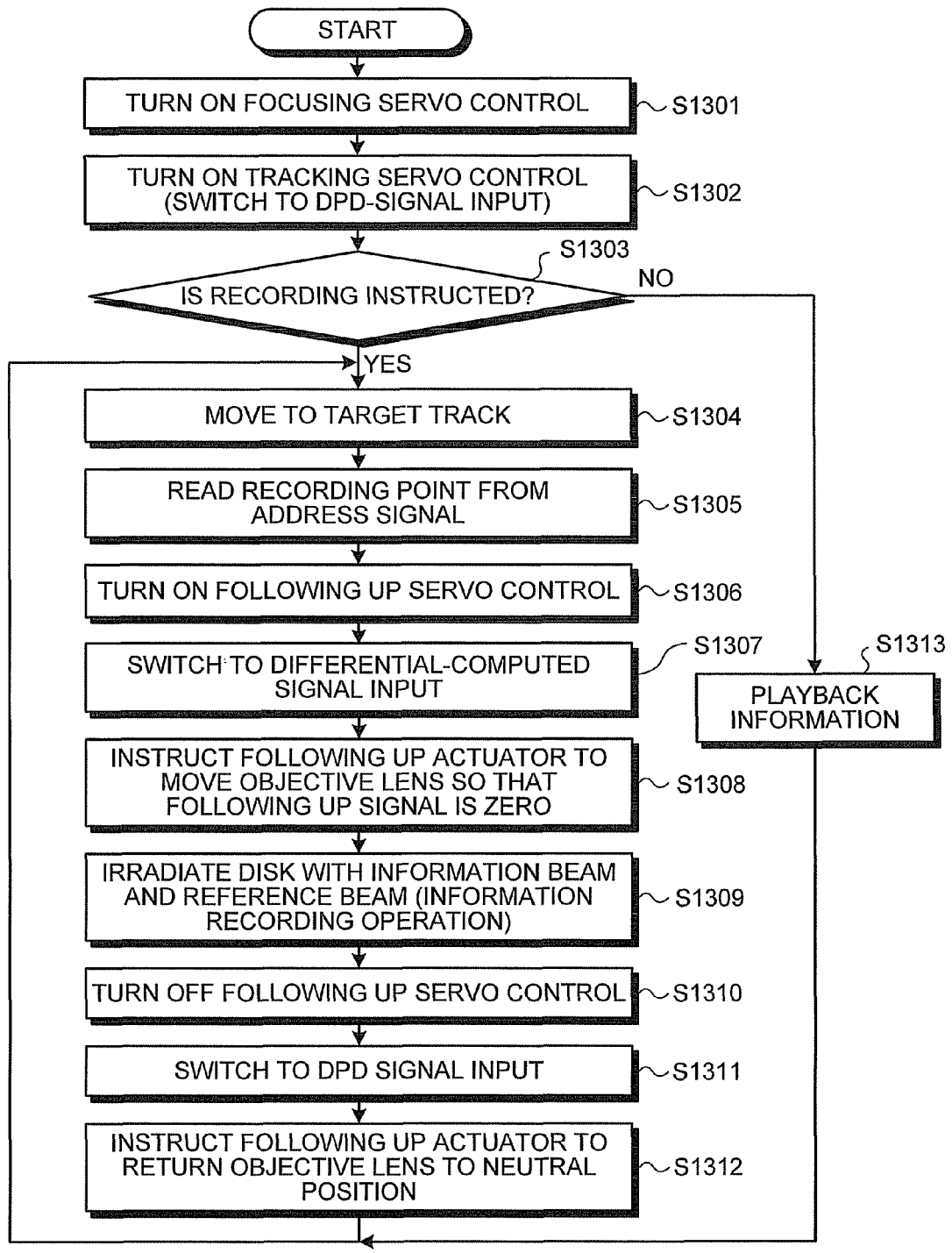
FIG. 13 is a flowchart of a process of recording and playing back a holographic record according to the first embodiment.

FIG. 13 is a flowchart of a process of recording and playing back a holographic record according to the first embodiment. The focusing control unit 602 turns on focusing servo control based on the instruction from the system controller 604, and starts focusing servo control using the astigmatism method based on the reflection of the servo beam 502 accepted by the photodetector 319 (step S1301).

The tracking control unit 603 turns on tracking servo control based on the instruction from the system controller 604, and connects the switch 729 to the differential amplifier 728 connected to the phase comparator 725, whereby switching to the DPD signal input (step S1302). At this time point, the DPD signal 715 acquired from the reflection of the diffracted beam 208 that irradiates the address pit row 204 is input to start the DPD-based tracking servo control. More specifically, the actuator 312 is driven by the DPD signal 715 acquired from the reflection of the diffracted beam 208 accepted by the acceptance surface 705.

The system controller 604 determines whether the instructed process is to record on the holographic-optical-disk 330 (step S1303). When the instruction is not to record (NO at step S1303), the record-playback apparatus plays back the information recorded in the holographic-recording medium layer 104 (step S1313).

On the other hand, when the instruction is to record information on the holographic-optical-disk 330 (YES at step S1303), the tracking control unit 603 moves the irradiation position to the target track (step S1304). The tracking control unit 603 acquires the address signal from the reflection of the diffracted beam 208 accepted by the acceptance surface 705 of the photodetector 320 and reads the target position to record the information from the address signal (step S1305).

The following up control unit 610 turns on following-up servo control based on the instruction from the system controller 604, and starts following-up servo control (step S1306). The tracking control unit 603 connects the switch 729 to the differential amplifier 722, whereby switching to input of the differential signal 708 (step S1307). As a result of this, tracking servo control is performed by inputting the differential signal 708 of trace signals acquired from the reflection of the diffracted beam 207 from the following-up pit row 203 during following-up servo control.

The following up control unit 610 performs following-up servo control by acquiring the following up signal 707 from the reflection of the diffracted beam 207, driving the following up actuator 340 so that the following up signal 707 indicates substantially zero, and moving the objective lens 310 and the reflecting mirror 309 in the track direction (step S1308). As a result of this, the diffracted beam 207 irradiates an end of a pit on the following up pit row 203.

The following up control unit 610 provides control to emit the record-playback beam 206 while driving the following up actuator 340 to retain the following up signal at substantially zero (step S1309). The beam splitter 324 divides the record-playback beam 206 from the laser beam emitted from the semiconductor laser 301, the information beam and the reference beam converted by the spatial light modulator 304 interfere with each other in the holographic-recording medium layer 104, and thus, the holographic information is recorded.

When the information recording operation is completed, the following up control unit 610 turns off following up control based on the instruction from the system controller 604 and terminates following-up servo control (step S1310). The tracking control unit 603 connects the switch 729 to the differential amplifier 728, whereby switching to the DPD signal input (step S1311). As a result of this, DPD-based tracking servo control is performed by inputting the DPD signal 715 while following-up servo control is not performed.

The following up control unit 610 then drives the following up actuator 340 to return the objective lens 310 and the reflecting mirror 309 to the neutral position (step S1312). The record-playback apparatus repeats the processes in steps S1304 and after.

Figure 14:
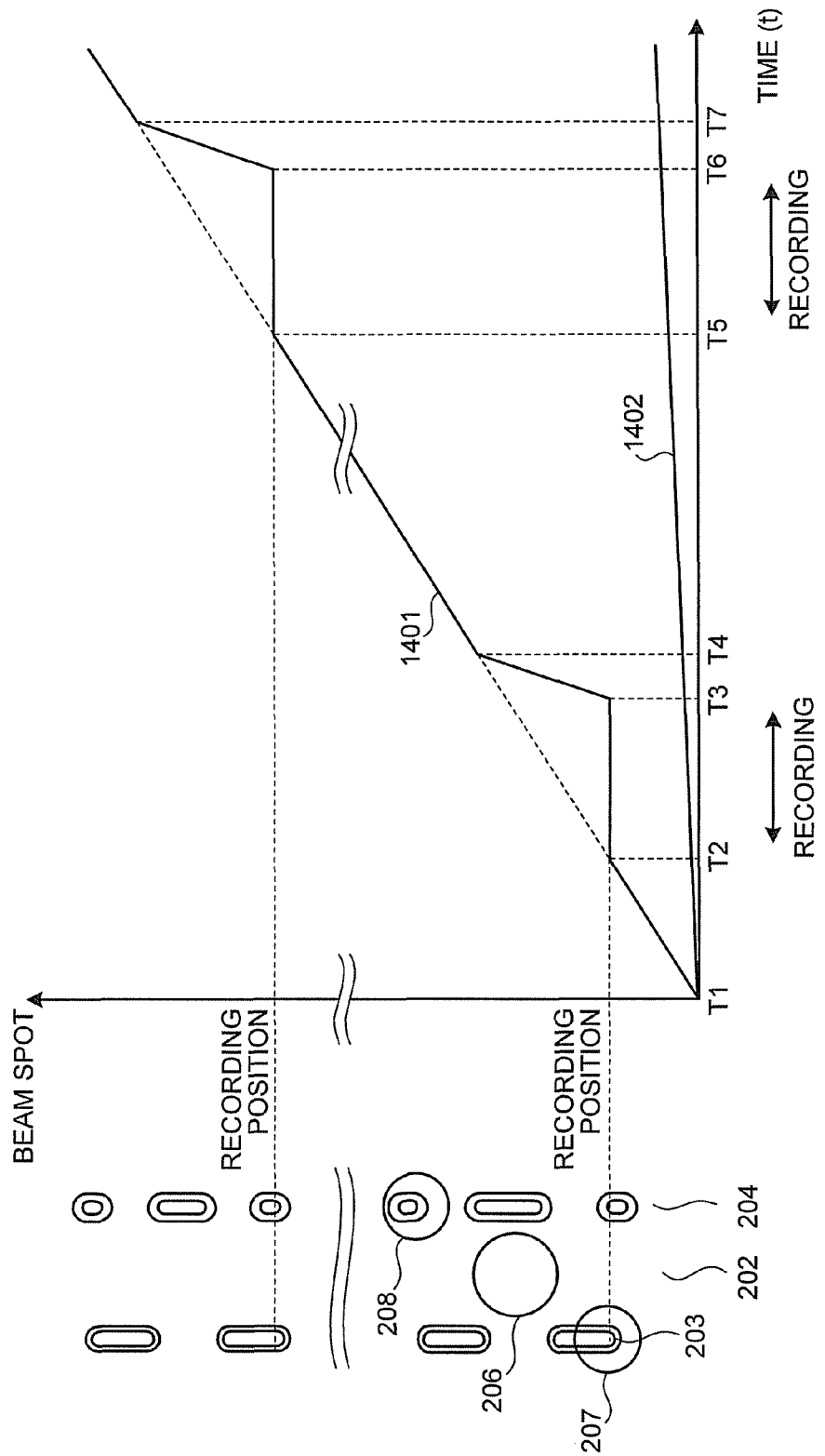
FIG. 14 is a schematic view for explaining relation between operation of recording the holographic record and the irradiation position of the diffracted beam of the servo laser according to the first embodiment.

FIG. 14 is a schematic view for explaining relation between an operation of recording the holographic record using the record-playback apparatus for holographic-optical-disk and locations of irradiation positions of the diffracted beams 207 and 208 according to the first embodiment. The horizontal axis indicates time and the vertical axis indicates the locations of the irradiation positions of the diffracted beams 207 and 208 aiming at a coordinate fixed on the holographic-optical-disk 330. The following-up pit row 203 and the address pit row 204 are also shown associated with the vertical axis. A line 1401 represents temporal alteration of the irradiation position of the diffracted beam 207 on the following-up pit row 203 when the recording operation is performed using the holographic-optical-disk 330 and the record-playback apparatus according to the first embodiment. A line 1402 represents the temporal alteration of the irradiation position when the recording operation is performed using an existing record-playback apparatus without following-up servo control.

During a period between T2 and T3 and a period between T5 and T6, the following up control is performed so that the following up signal is substantially zero, the beam follows up the end of the pit in the following-up pit row 203 on the rotating holographic-optical-disk 330, and the holographic recording operation is performed during these periods.

A period between T3 and T4 and a period between T6 and T7 are transition periods from the following up control to the normal operation. During a period between T1 and T2, a period between T4 and T5, and a period after T7, the holographic recording operation is not performed, and the line 1401 inclines according to the rotation of the disk during these periods.

On the other hand, because the following up control is not performed, the existing record-playback apparatus requires the optical disk to rotate at a very low speed as indicated by the line 1402 to keep the misalignment during a single exposure within the tolerance.

Figure 15:
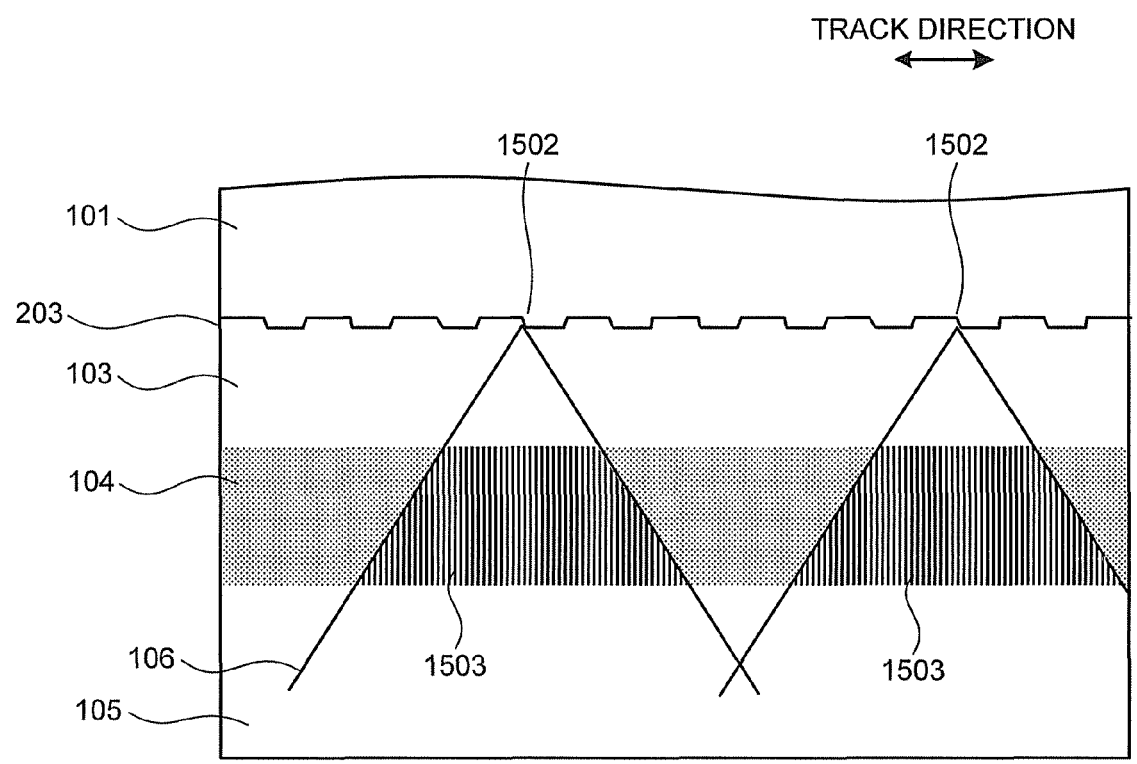
FIG. 15 is a schematic view for explaining positional relation between the following-up pit row and holograms recorded in a holographic-recording medium layer.

FIG. 15 is a schematic view for explaining positional relation between the following-up pit row 203 and holograms recorded in the holographic recording medium layer 104. The holograms shown in FIG. 15 are enlarged more than the pits in the following-up pit row 203 for convenience of explanation. The track direction runs laterally. The diffracted beam of the record-playback beam 206 records a hologram 1503 in the holographic-recording medium layer 104 when the diffracted beam 207 irradiates a pit end 1502 on the following-up pit row 203. By recording information in a location in the holographic-recording medium layer 104 when the diffracted beam 207 irradiates the pit end 1502 on the following-up pit row 203 preformatted on the servo surface, the high-quality holographic recording can be performed.

According to the first embodiment, because holographic recording is performed with the record-playback beam 206 during following up control, both of following-up servo control and tracking servo control are accurate enough to perform fine alignment of the record-playback beam 206 to the target recording point that enables high-quality holographic recording.

Moreover, because the record-playback apparatus for holographic-optical-disk according to the first embodiment performs tracking servo control using the differential signal 708 during following-up servo control and performs tracking servo control by the DPD method when following-up servo control is not performed, stable tracking servo control can be performed no matter following-up servo control is performed.

Figure 16:
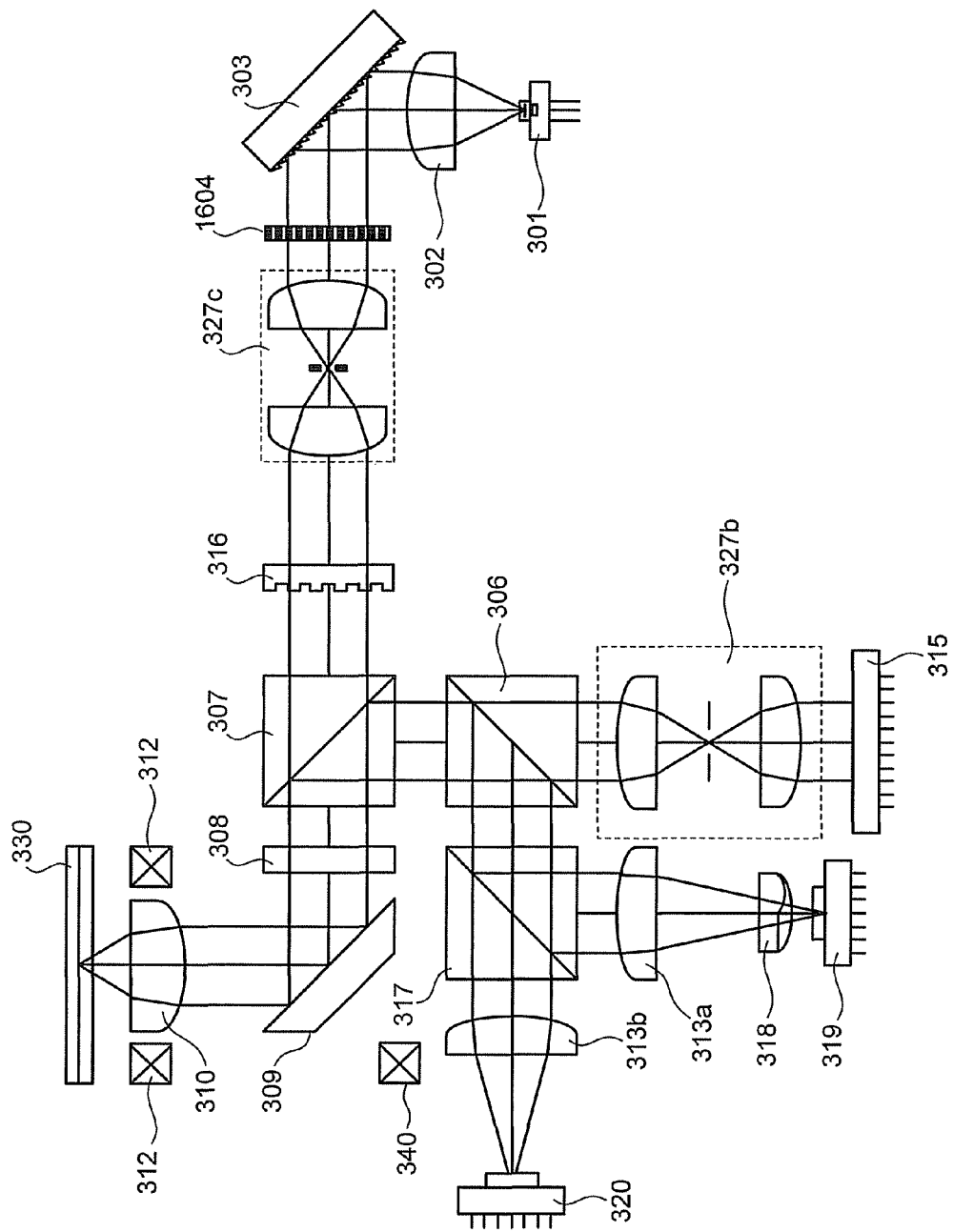
FIG. 16 is a schematic view for explaining a configuration of an optical system in a record-playback apparatus for holographic-optical-disk according to a second embodiment.

FIG. 16 is a schematic view for explaining a configuration of an optical system in a record-playback apparatus for holographic-optical-disk according to a second embodiment.

The configuration of the holographic-optical-disk used by the record-playback apparatus according to the second embodiment is identical to that of the holographic-optical-disk according to the first embodiment.

The record-playback apparatus for holographic-optical-disk according to the second embodiment uses the collinear holographic recording method as with the first embodiment, where the information beam and the reference beam are coaxially arranged.

The optical system in the record-playback apparatus for holographic-optical-disk according to the second embodiment includes the semiconductor laser 301, the collimating lens 302, the diffraction grating 303 as the resonator, a spatial light modulator 1604, the spatial filter 327b, a spatial filter 327c, the diffraction grating 316, the polarization beam splitter 307, the quarter-wave plate 308, the reflecting mirror 309, the objective lens 310, the beam splitters 306 and 317, the condenser lenses 313a and 313b, the cylindrical lens 318, the photodetectors 319 and 320, and the CMOS solid-state image sensor 315. The actuator 312 and the following up actuator 340 are also shown in FIG. 16 as part of the servo system.

To reduce the noise in various servo signals, the record-playback apparatus according to the first embodiment is configured to divide the laser beam emitted from the semiconductor laser 301 into the record-playback beam 206 and the servo beam 502 using the beam splitter 324 so that the light intensity of the servo beam 502 is not modulated.

However, when the noise in the servo signals is within the tolerance, it is not necessary to divide the laser beam before modulating the light intensity. In such a case, the record-playback apparatus does not need the beam splitter 324, the mirror 325, and the like, whereby reducing the number of the optical components to be used. Taking advantage of this, the record-playback apparatus according to the second embodiment does not include some optical components such as the beam splitter 324 and the mirror 325. Instead, the laser beam emitted from the semiconductor laser 301 enters the spatial light modulator 1604 to generate the information beam and the reference beam without being divided in advance.

The record-playback apparatus according to the second embodiment uses a transmissive liquid-crystal device as the spatial light modulator 1604. The spatial filter 327c removes undesired higher-order light from the laser beam including the information beam and the reference beam emitted from the spatial light modulator 1604, and the resulting laser beam enters the diffraction grating 316.

The laser beam is diffracted by the diffraction grating 316, and divided into the three diffracted beams; the zeroth order beam, the plus-first order beam, and the minus-first order beam. The zeroth order beam is used as the record-playback beam 206, and the plus-first order beam and the minus-first order beam are used as the servo beam 502.

The plus-first order beam is the diffracted beam 208 that irradiates the address pit row 204 on the servo surface 102, and the minus-first order beam is the diffracted beam 207 that irradiates the following-up pit row 203. The zeroth order beam is the record-playback beam 206 that irradiates the servo surface 102. Otherwise, the minus-first order beam can be used as the diffracted beam 208 that irradiates the address pit row 204, and the plus-first order beam can be used as the diffracted beam 207 that irradiates the following-up pit row 203.

The servo mechanism in the record-playback apparatus according to the second embodiment is identical to that in the record-playback apparatus according to the first embodiment. The record-playback apparatus according to the second embodiment performs focusing servo control, tracking servo control, and following-up servo control in the same manner as the record-playback apparatus according to the first embodiment.

As described above, the record-playback apparatus according to the second embodiment diffracts the laser beam emitted from the semiconductor laser 301 into the three beams and uses the zeroth order beam as the record-playback beam 206 and the plus-and-minus-first order beams as the servo beam 502. This reduces the number of the optical components, whereby simplifying the optical system in the record-playback apparatus.

The configuration of the holographic-optical-disk used by the record-playback apparatus for holographic-optical-disk according to a third embodiment is identical to that of the holographic-optical-disk according to the first embodiment. The optical system in the record-playback apparatus according to the third embodiment is also identical to that in the record-playback apparatus according to the first embodiment.

The configuration of the servo mechanism in the record-playback apparatus according to the third embodiment is identical to that in the record-playback apparatus according to the first embodiment, except for the process of generating the tracking error signal for tracking servo control by the tracking control unit 603.

Figure 17:
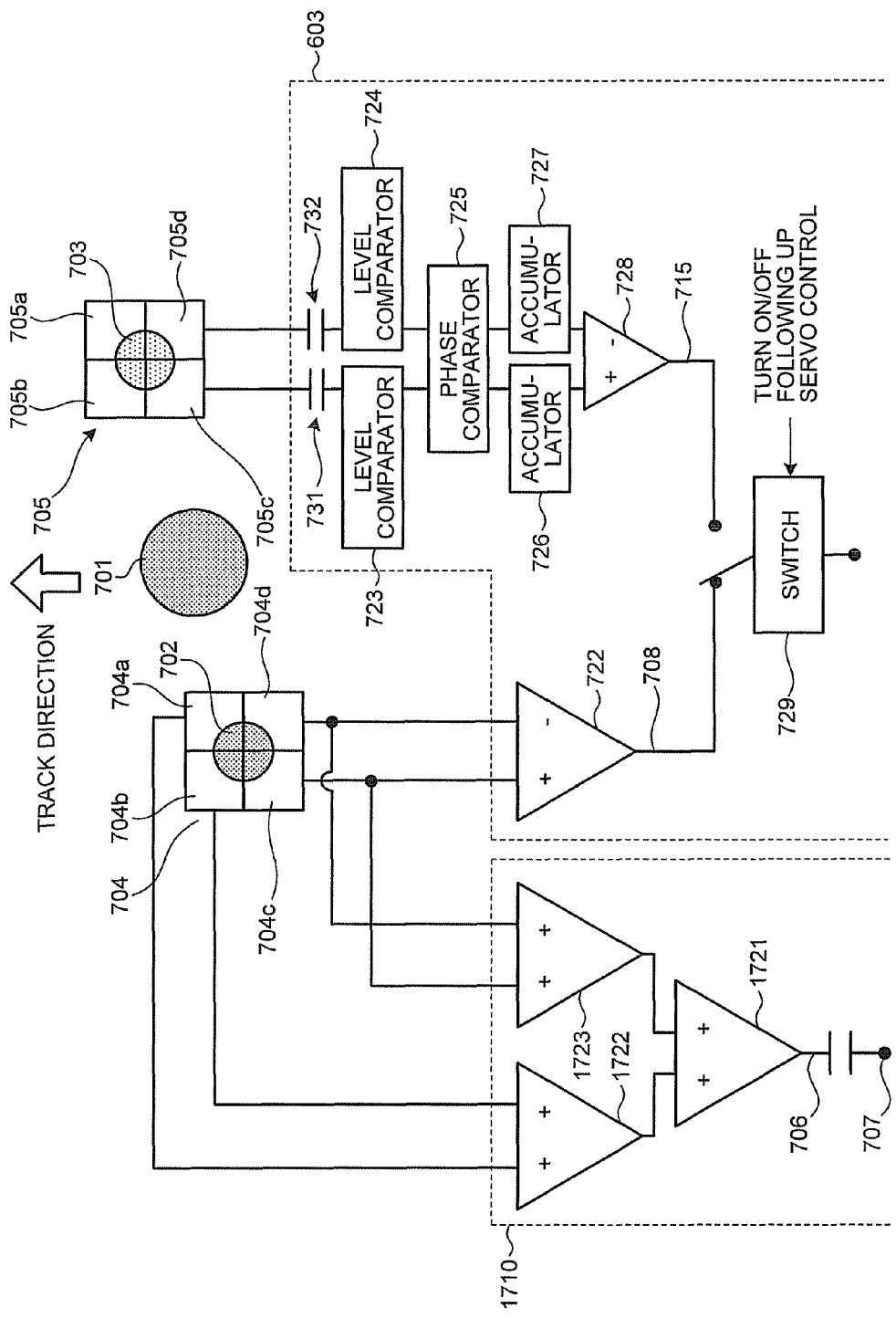
FIG. 17 is a schematic view for explaining a configuration of a photo detector according to a third embodiment.

FIG. 17 is a schematic view for explaining a configuration of acceptance surfaces of the photo detector 320, arrangement of the beam spot on each of acceptance surfaces, and signal circuits that generate tracking-error signals and following up signals from reflections according to the third embodiment. As with the first embodiment, the reflection of the diffracted beam 207 from the servo surface 102 shown in FIG. 2 enters the acceptance surface 704 to form the beam spot 702, and the reflection of the diffracted beam 208 enters the acceptance surface 705 to form the beam spot 703.

The acceptance surface 704 of the photo detector 320 is divided into the four sectional acceptance surfaces 704a to 704d. Two signals from the beam spot on the sectional acceptance surfaces 704a and 704b adjacent to each other at the advanced side in the track direction are added by an adding circuit 1722 in a following up control unit 1710 to be output as a multiple signal. Two signals from the beam spot on the sectional acceptance surfaces 704c and 704d adjacent to each other at the closer side in the track direction are added by an adding circuit 1723 in the following up control unit 1710 to be output as another multiple signal. The two multiple signals output from the adding circuits 1722 and 1723 are added by an adding circuit 1721 to be output as the multiple signal 706. Specifically, the multiple signal 706 is acquired from the entire beam spot of the reflection of the diffracted beam 207 that has been irradiated to the following-up pit row 203 and was accepted on the acceptance surface 704. The multiple signal 706 is AC-coupled by the AC-coupling capacitor 611, and thereby the alternating component is output as the following up signal 707. The following up signal 707 is output to the following up actuator 340 after the same process as in the first embodiment.

The record-playback apparatus according to the third embodiment performs tracking servo control by the DPD method while following-up servo control is not performed, and performs tracking servo control using the signal intensity of the reflection from the following-up pit row 203 during following-up servo control.

During following-up servo control, two signals from each beam spot on the adjacent sectional acceptance surfaces 704c and 704*d* are input to the differential amplifier 722 in the tracking control unit 603. The differential amplifier 722 computes the difference between the two signals, and the resulting differential signal 708 is output as the tracking error signal.

The record-playback apparatus according to the third embodiment does not use the differential signal of two trace signals for the following reason. As shown in FIG. 10, when the servo beam 502 is misaligned, the light intensities of the reflections on the adjacent two sectional acceptance surfaces are different. Therefore, the record-playback apparatus according to the third embodiment performs tracking servo control using the differential signal 708 of the signals from each beam spot on the sectional acceptance surfaces 704*c* and 704*d* without using the trace signals of the beam spots on the four sectional acceptance surfaces during tracking servo control. This reduces the burden of signal processing and increases the processing speed of tracking servo control.

While the beam spots on the adjacent sectional acceptance surfaces 704*c* and 704*d* closer in the track direction are used to compute the differential signal 708 according to the third embodiment, the record-playback apparatus can be configured to compute the differential signal 708 from beam spots on any of the adjacent sectional acceptance surfaces so that the presence and the direction of the misalignment can be determined.

The acceptance surface 705 is divided into the four sectional acceptance surfaces 705*a* to 705*d* as with the first embodiment. The signals from the beam spot on the sectional acceptance surfaces 705*c* and 705*d* adjacent to each other on the closer side in the track direction are AC-coupled by the capacitors 731 and 732 in the tracking control unit 603 respectively. The resulting signals 709 and 710 including the alternating components are input to the level comparators 723 and 724, and the signals 711 and 712 from the level comparators 723 and 724 are input to the phase comparator 725. The signals 713 and 714 output from the phase comparator 725 are accumulated by the accumulators 726 and 727 at a predetermined time interval to be input to the differential amplifier 728. The differential amplifier 728 then outputs the DPD signal 715 indicative of the phase difference between two trace signals.

While the beam spots on the adjacent acceptance surfaces 705*c* and 705*d* closer in the track direction are used to compute the DPD signal 715 according to the third embodiment, the record-playback apparatus can be configured to compute the DPD signal 715 from beam spots on any of the adjacent acceptance surfaces so that the presence and the direction of the misalignment can be determined.

When the following-up servo control starts, based on the instruction from the system controller 604, the tracking control unit 603 connects the switch 729 to the differential amplifier 722, and inputs the differential signal 708 to start tracking servo control.

When the following-up servo control is terminated, based on the instruction from the system controller 604, the tracking control unit 603 connects the switch 729 to the differential amplifier 728 connected to the phase comparator 725, and inputs the DPD signal 715 to perform tracking servo control by the DPD method.

The record-playback apparatus according to the third embodiment performs focusing servo control, tracking servo control, and following-up servo control in the same manner as the record-playback apparatus according to the first embodiment.

According to the third embodiment, tracking servo control is performed using the differential signal of the signals from two adjacent acceptance surfaces during following-up servo control. On the other hand, when following-up servo control is not performed, tracking servo control is performed using the DPD signal generated from the signals from two adjacent sectional acceptance surfaces, which accepts the reflection of the diffracted beam 208 from the address pit row 204. As a result, compared with a case of generating tracking error signals using the beam spots on all of the four acceptance surfaces, the burden of the signal processing is reduced, and the tracking servo control is performed at a higher speed with high accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical-information recording medium comprising:
a substrate that includes a servo surface having a servo pattern thereon;
an information recording layer laminated on the servo surface of the substrate capable of recording information as a hologram produced by interference between an information beam containing the information and a reference beam;
an address servo area that is formed as a part of the servo pattern in a track direction on the servo surface, and that records therein address information and clock information for aligning a beam, emitted from an optical-information recording apparatus for recording information in the information recording layer, to a target position in the information recording layer; and
a following up servo area that is formed as a part of the servo pattern in the track direction on the servo surface, and that is to be irradiated by the beam to make the beam follow a rotation of the optical-information recording medium, wherein
the address servo area and the following up servo area are arranged in parallel extending in circumferential direction on the optical-information recording medium.

2. The medium according to claim 1, wherein a plurality of following up pits are formed in the following up servo area at intervals equal to a shifting distance for shift-multiplex recording the information.

3. The medium according to claim 1, wherein the following up servo area and the address servo area are arranged in parallel within the shifting distance for shift-multiplex recording the information extending in the circumferential direction on the optical-information recording medium.

4. The medium according to claim 1, wherein the address servo area includes a plurality of address pits recorded with the address information and the clock information.

5. The medium according to claim 1, further comprising:
a gap layer that is transparent laminated on the servo surface, wherein
the information recording layer is laminated on the gap layer.

6. An optical-information recording apparatus comprising:
a motor that rotates an optical-information recording medium;
a light source that emits a beam;
a generating unit that generates a recording beam that includes an information beam containing information and a reference beam, a first diffracted beam that is a servo beam, and a second diffracted beam that is the servo beam, from the beam emitted from the light source;

a condenser that focuses the information beam and the reference beam on an optical-information recording medium, focuses the first diffracted beam on a following up servo area, and focuses the second diffracted beam on an address servo area, the optical-information recording medium being included:

a substrate that includes a servo surface having a servo pattern thereon, an information recording layer laminated on the servo surface of the substrate capable of recording information as a hologram produced by interference between an information beam containing the information and a reference beam, the address servo area that is formed as a part of the servo pattern in a track direction on the servo surface, and that records therein address information and clock information for aligning the beam to a target position in the information recording layer, and the following up servo area that is formed as a part of the servo pattern in the track direction on the servo surface, and that is to be irradiated by the beam so as to make the beam follow a rotation of the optical-information recording medium, wherein the address servo area and the following up servo area are arranged in parallel extending in circumferential direction on the optical-information recording medium;

a servo photodetector that detects a first reflection of the first diffracted beam reflected from the following up servo area and a second reflection of the second diffracted beam reflected from the address servo area;

an irradiation-position shifting unit that shifts irradiation positions of the first diffracted beam and the second diffracted beam on the optical-information recording medium by moving the condenser; and a following up control unit that performs following-up servo control to control the irradiation-position shifting unit based on the first reflection by shifting the irradiation positions of the first diffracted beam, the second diffracted beam, and the recording beam to follow rotation of the optical-information recording medium so that relative velocity between the optical-information recording medium and the irradiation positions is substantially zero, and that records the information during the following-up servo control.

7. The apparatus according to claim 6, wherein the generating unit includes a dividing unit that divides the beam emitted from the light source into the recording beam and the servo beam, a spatial light modulating unit that converts the recording beam to an information beam containing the information and a reference beam, and a diffracting unit that diffracts the servo beam into at least a first diffracted beam and a second diffracted beam.

8. The apparatus according to claim 7, wherein the diffracting unit diffracts the servo beam into a zeroth order beam, the first diffracted beam, and the second diffracted beam, and the diffracting unit is a diffraction grating with pattern depth that minimizes diffraction efficiency of the zeroth order beam.

9. The apparatus according to claim 6, wherein the generating unit includes a spatial light modulating unit that converts the beam emitted from the light source to the information beam containing the information and the reference beam, and a diffracting unit that diffracts the beam emitted from the light source into at least the recording beam, the first diffracted beam, and the second diffracted beam.

10. The apparatus according to claim 6, wherein the following-up servo control unit performs following-up servo control when the servo photodetector detects the first reflection from an end of one of the following up pits formed in the following up servo area at intervals equal to a shifting distance for shift-multiplex recording the information.

11. The apparatus according to claim 10, wherein the following up control unit determines that the first reflection from the end of one of the following up pit is detected when a following up signal that is an alternating component of an electrical signal converted from the first reflection is substantially zero, and performs following up servo so that the following up signal is substantially zero.

12. The apparatus according to claim 6, further comprising:

a tracking control unit that reads the address information of the target position to perform alignment control based on the second reflection from the address servo area, and performs tracking servo control.

13. The apparatus according to claim 12, wherein the tracking control unit switches tracking servo methods between when following-up servo control is performed and when following-up servo control is not performed.

14. The apparatus according to claim 13, wherein the tracking control unit performs tracking servo control based on the first reflection from the following up servo area when following-up servo control is performed, and performs tracking servo control based on the second reflection from the address servo area when following-up servo control is not performed.

15. The apparatus according to claim 14, wherein the servo photodetector includes a first acceptance unit divided into a plurality of sections that accept the first reflection and a second acceptance unit divided into a plurality of sections that accept the second reflection, and the tracking control unit performs tracking servo control based on light intensity of the first reflection accepted by the first acceptance unit when following-up servo control is performed, and performs tracking servo control by differential phase detection method based on signals converted from the second reflection accepted by the second acceptance unit when following-up servo control is not performed.

16. The apparatus according to claim 15, wherein the first acceptance unit is divided into four sectional acceptance surfaces, and the tracking control unit performs tracking servo control based on a differential signal of two trace signals indicative of the light intensity of the first reflection accepted by two opposing sectional acceptance surfaces on the first acceptance unit during following-up servo control.

17. The apparatus according to claim 16, wherein the second acceptance unit is divided into four sectional acceptance surfaces, and the tracking control unit performs tracking servo control by the differential phase detection method based on a differential signal of two trace signals indicative of the light intensity of the first reflection accepted by two opposing sectional acceptance surfaces on the second acceptance unit while following-up servo control is not performed.

18. The apparatus according to claim 15, wherein the first acceptance surface is divided into four sectional acceptance surfaces, and the tracking control unit performs tracking servo control based on a differential signal of two signals indicative of the light intensity of the first reflection accepted by two adjacent sectional acceptance surfaces on the first acceptance surface during following-up servo control.

19. The apparatus according to claim 18, wherein the second acceptance surface is divided into four sectional acceptance surfaces, and the tracking control unit performs tracking servo control by the differential phase detection method based on two signals converted from the second reflection accepted by two adjacent sectional acceptance surfaces on the second acceptance surface while following-up servo control is not performed.

20. An optical-information recording method comprising:

rotating an optical-information recording medium;

emitting a beam from a light source;

generating a recording beam that includes an information beam containing information and a reference beam, a first diffracted beam that is a servo beam, and a second diffracted beam that is the servo beam, from the beam emitted from the light source;

focusing the information beam and the reference beam on an optical-information recording medium;

focusing the first diffracted beam on a following up servo area;

focusing the second diffracted beam on an address servo area, the optical-information recording medium being included:

a substrate that includes a servo surface having a servo pattern thereon, an information recording layer laminated on the servo surface of the substrate capable of recording information as a hologram produced by interference between an information beam containing the information and a reference beam, the address servo area that is formed as a part of the servo pattern in a track direction on the servo surface, and that records therein address information and clock information for aligning the beam to a target position in the information recording layer, and the following up servo area that is formed as a part of the servo pattern in the track direction on the servo surface, and that is to be irradiated by the beam so as to make the beam follow a rotation of the optical-information recording medium, wherein the address servo area and the following up servo area are arranged in parallel extending in circumferential direction on the optical-information recording medium;

detecting a first reflection of the first diffracted beam reflected from the following up servo area and a second reflection of the second diffracted beam reflected from the address servo area;

shifting irradiation positions of the first diffracted beam and the second diffracted beam on the optical-information recording medium by moving the condenser;

performing following-up servo control based on the first reflection by shifting the irradiation positions of the first diffracted beam, the second diffracted beam, and the recording beam to follow rotation of the optical-information recording medium so that relative velocity between the optical-information recording medium and the irradiation positions is substantially zero; and recording the information during the following-up servo control.

* * * * *